US012770245B2

(12) United States Patent
Anderson et al.

(10) Patent No.: US 12,770,245 B2
(45) Date of Patent: Oct. 20, 2026

(54) AUTOMATED VISUAL-INSPECTION SYSTEM

(71) Applicant: Lam Research Corporation, Fremont, CA (US)

(72) Inventors: Collin Michael Anderson, Berkeley, CA (US); Roderick Mosely, Pleasanton, CA (US)

(73) Assignee: Lam Research Corporation, Fremont, CA (US)

( * ) Notice: Subject to any disclaimer, the term of this patent is extended or adjusted under 35 U.S.C. 154(b) by 348 days.

(21) Appl. No.: 17/927,661

(22) PCT Filed: May 26, 2021

(86) PCT No.: PCT/US2021/070609
§ 371 (c)(1),
(2) Date: Nov. 23, 2022

(87) PCT Pub. No.: WO2021/243360
PCT Pub. Date: Dec. 2, 2021

(65) Prior Publication Data

US 2023/0222646 A1 Jul. 13, 2023

Related U.S. Application Data

(60) Provisional application No. 63/032,243, filed on May 29, 2020.

(51) Int. Cl.
*G06T 7/00* (2017.01)
*G06T 7/136* (2017.01)

(52) U.S. Cl.
CPC .............. *G06T 7/001* (2013.01); *G06T 7/136* (2017.01); *G06T 2207/10056* (2013.01); *G06T 2207/10121* (2013.01); *G06T 2207/30148* (2013.01)

(58) Field of Classification Search
CPC ..................... G06T 7/001; G06T 7/136; G06T 2207/10056; G06T 2207/30148;
(Continued)

(56) References Cited

U.S. PATENT DOCUMENTS 10,181,185 B2 * 1/2019 Park ..................... G06T 7/0004
2006/0078191 A1 * 4/2006 Matsumura ........ G01N 21/8851
382/149

(Continued)

FOREIGN PATENT DOCUMENTS

CN 116134305 5/2023
JP 2000077495 3/2000

(Continued)

OTHER PUBLICATIONS

W. J. Tee, M. P. -L. Ooi, Y. C. Kuang and C. Chan, "Defect cluster segmentation for CMOS fabricated wafers," 2009 Innovative Technologies in Intelligent Systems and Industrial Applications, Kuala Lumpur, Malaysia, 2009, pp. 134-138, doi: 10.1109/CITISIA.2009.5224225. (Year: 2009).*

(Continued)

*Primary Examiner* — Vu Le
*Assistant Examiner* — Zaid Muhammad Saleh
(74) *Attorney, Agent, or Firm* — Schwegman Lundberg & Woessner, P.A.

(57) ABSTRACT

Various examples include systems, apparatuses, and methods to perform an automated visual-inspection of components undergoing various stages of fabrication. In one example, an inspection system includes a number of robots, each having a camera, to inspect a component for defects at various stages of fabrication. Generally, each of the cameras is located at a different geographical location corresponding to the various stages in the fabrication of the component. At least some of the cameras are arranged to inspect all surfaces (Continued)

of the component that are not facing a table upon which the component is mounted. The system also includes a respective data-collection station electronically coupled to each the number of robots and an associated one of the cameras. A master data-collection station is electronically coupled to each of the data-collection stations. Other systems, apparatuses, and methods are disclosed.

26 Claims, 15 Drawing Sheets

(58) Field of Classification Search
CPC ............... G01N 21/954; G01N 23/223; G01N 21/9515; G01N 2021/9518; H01L 22/12
See application file for complete search history.

(56) References Cited

U.S. PATENT DOCUMENTS

| | | | | |
|---|---|---|---|---|
| 2011/0298901 | A1 | 12/2011 | Derrien et al. | |
| 2016/0063691 | A1 | 3/2016 | Whipple | |
| 2019/0206045 | A1* | 7/2019 | Wang | G06T 7/001 |
| 2020/0056336 | A1* | 2/2020 | Flitsch | E01C 23/07 |
| 2020/0143528 | A1* | 5/2020 | Kulkarni | G06V 20/69 |
| 2022/0148152 | A1* | 5/2022 | Hyatt | G06T 7/38 |

FOREIGN PATENT DOCUMENTS

| | | | | |
|---|---|---|---|---|
| JP | 2003188064 A | | 7/2003 | |
| JP | 2004071671 A | | 3/2004 | |
| JP | 2004226328 | | 8/2004 | |
| JP | 2007003532 A | | 1/2007 | |
| JP | 2008076218 A | | 4/2008 | |
| JP | 5264061 B2 | * | 8/2013 | G01N 23/22 |
| JP | 2013168358 | | 8/2013 | |
| JP | 2017062160 A | * | 3/2017 | |
| JP | 2018128339 A | | 8/2018 | |
| JP | 2019049509 A | | 3/2019 | |
| JP | 2023528378 | | 7/2023 | |
| TW | I910171 B | | 1/2026 | |
| WO | 0223480 | | 3/2002 | |
| WO | 2019041952 | | 3/2019 | |
| WO | WO-2019226328 A1 | | 11/2019 | |
| WO | WO-2021243360 A1 | | 12/2021 | |

OTHER PUBLICATIONS

International Application Serial No. PCT/US2021/070609, International Search Report mailed Sep. 16, 2021, 3 pgs.
International Application Serial No. PCT/US2021/070609, Written Opinion mailed Sep. 16, 2021, 7 pgs.
"International Application Serial No. PCT US2021 070609, International Preliminary Report on Patentability mailed Dec. 8, 2022", 9 pgs.
"Taiwanese Application Serial No. 110119162, Response filed Mar. 13, 2025 to Office Action mailed Dec. 13, 2024", w English claims, 51 pgs.
Japanese Application Serial No. 2022-573166, Response filed Jul. 16, 2025 to Notification of Reasons for Rejection mailed Mar. 18, 2025, W/ English Claims, 20 pgs.
"Japanese Application Serial No. 2022-573166, Notification of Reasons for Rejection mailed Mar. 18, 2025", W English Translation, 13 pgs.
"Taiwanese Application Serial No. 110119162, Office Action mailed Dec. 13, 2024", w English translation, 46 pgs.
Japanese Application Serial No. 2022-573166, Notification of Reasons for Refusal mailed Nov. 4, 2025, w/ English Translation, 28 pgs.
Korean Application Serial No. 10-2022-7044303, Notice of Preliminary Rejection mailed Dec. 14, 2025, w/ English translation, 17 pgs.
Korean Application Serial No. 10-2022-7044303, Response filed Apr. 14, 2026 to Notice of Preliminary Rejection mailed Dec. 14, 2025, W/English Claims, 40 pgs.

* cited by examiner

590

AUTOMATED VISUAL-INSPECTION SYSTEM

CLAIM OF PRIORITY

This patent application is a U.S. National Stage Filing under 35 U.S.C. 371 from International Application No. PCT/US2021/070609, filed on May 26, 2021, and published as WO 2021/243360 A1 on Dec. 2, 2021, which claims priority to U. S. Provisional application Ser. No. 63/032,243, entitled, "AUTOMATED VISUAL-INSPECTION SYSTEM," filed 29 May 2020; the disclosure of each of which is incorporated herein by reference in its entirety.

TECHNOLOGY FIELD

The disclosed subject matter is generally related to the field of inspection of manufactured components. More specifically, in various embodiments, the disclosed subject matter is related to an automated inspection of components used in the field of semiconductor equipment and allied industries.

BACKGROUND

Currently, as a manufactured component moves through various fabrication processes, the component may pass between several suppliers or various processes within the facilities of one or more of the suppliers. Each of the suppliers or processes typically has various levels of inspection capabilities associated with the component at a particular stage in the fabrication process. However, because of the limited inspection capabilities currently associated with each inspection step, an inspected area of a component may only be 1% or less. As is known to a person of ordinary skill in the art, a 1% inspection area relates to providing only a 4% confidence level (CI). The 4% CI is a statistical indicator that the true parameter of interest is in the proposed 1% inspection range. Consequently, there is a large portion of the component that is not inspected. These uninspected areas often have a high level of particulate and other defect types, making the component unusable. Further, a complex machine, such as a semiconductor process tool (e.g., a plasma-based deposition tool), may require dozens of components. Most of these components are manufactured by a variety of suppliers that are separate entities from the final manufacturer of the tool.

For example, with reference to FIG. 1, a high-level overview of current inspection procedures 100 currently performed under the prior art is shown. The current inspection procedures include a number of suppliers 101A through 101C (or various processes within the facilities of the one or more suppliers). Each of the suppliers 101A through 101C typically includes a visual inspection 103A through 103C of a component 105A through 105C of various stages of the fabrication. Since the human eye is not capable of detecting all defects, some of the fabrication steps may be supplemented with a more detailed level of inspection 111B and 111C.

The more detailed level of inspection 111B and 111C may be accomplished through various inspection means known in the art such as by microscopy, optical profilometry, stylus-based profilometry, or other techniques. In some cases, the inspection means may be supplemented by a roughness measurement of the component 105A through 105C. In other cases, only a roughness measurement of the component 105A through 105C is performed. However, as noted above, the area of the more detailed inspection or roughness measurement is typically limited to perhaps 1% or less of the total area of the component 105A through 105C. Consequently, a large percentage of the component 105A through 105C may not have any detailed inspection performed thereon. Further, many inspection techniques are limited only to a top or planar surface of the component. Such inspection techniques only consider a two-dimensional surface of the component so three-dimensional aspects, such as sidewalls, recesses, or projections, are often never subjected to a detailed inspection.

After or during a time period in which the visual inspection 103A through 103C and the detailed level of inspection 111B and 111C steps are performed, each of the suppliers 101A through 101C may prepare quality-control documentation 107A through 107C and store the documentation locally in local file-stores 109A through 109C.

Once a final version of the component (e.g., a completed component 155) is delivered to a customer 151 (e.g., either an end user of the component or a manufacturer of a piece of equipment that uses the component (e.g., an original-equipment manufacturer or OEM), a final visual inspection 153 and detailed level of inspection 161 may be performed on the completed component 155. In accordance with process-control procedures of the customer 151, quality-control documentation 157 may be generated. The quality-control documentation 157 may then be stored locally in a file database 159.

The background description provided herein is generally to present the context of the disclosure. It should be noted that the information described in this section is presented to provide the skilled artisan some context for the following disclosed subject matter and should not be considered as admitted prior art. More specifically, work of the presently named inventors, to the extent it may be described in this background section, as well as aspects of the description that may not otherwise qualify as prior art at the time of filing, are neither expressly nor impliedly admitted as prior art against the present disclosure.

SUMMARY

In various embodiments, an inspection system that includes a plurality of robots with one or more cameras coupled to each of respective ones of the plurality of robots to inspect a component for defects at various stages of fabrication is disclosed. Each of the cameras is located at a different geographical location corresponding to the various stages in the fabrication of the component. At least some of the cameras are configured to inspect all surfaces of the component that are not facing a table upon which the component is mounted. A data-collection station is electronically coupled to each of respective ones of the plurality of robots and an associated one of the cameras. A master data-collection station, which may be locally-based or remotely-based, is electronically coupled to each of the data-collection stations. The master data-collection station may be stationed at, for example, in local proximity to the inspection system or remotely-located relative to the inspection system.

In various embodiments, a method for operating an automated visual-inspection (AVI) system for detecting features and defects on a component is disclosed. The method includes calibrating the AVI system; capturing a plurality of images from the component; and loading each of the plurality of captured images into a program to analyze the captured images for a presence of defects within the captured images. The detected features may be classified as actual defects using a local machine-learning inference algorithm, described in more detail below.

In various embodiments, an automated visual-inspection (AVI) system is disclosed that is used to detect defects on a component. The AVI system includes a number of robots, with each of the plurality of robots having a mounted camera and lens combination to inspect the component undergoing fabrication steps at various stages of fabrication. The camera includes a digital-imaging sensor. Each of the number of robots is located at a different geographical location corresponding to the various stages in the fabrication of the component. The AVI system also includes a data-collection station that is electronically coupled to each of respective ones of the numbers of robots, and a master data-collection station that is electronically coupled to each of the data-collection stations. The data-collection station may include software that enables classification of features as defects using machine-learning inference algorithm. The master data-collection station can be arranged to compare an idealized sample of the component to an actual version of the component at each step in the various stages of the fabrication of the component. The master data-collection system images may be used to train the machine-learning inference algorithm to enhance precision of defect identification.

DETAILED DESCRIPTION

The description that follows includes illustrative examples, devices, apparatuses, and methods that embody various aspects of the disclosed subject matter. In the following description, for purposes of explanation, numerous specific details are set forth in order to provide an understanding of various embodiments of the inventive subject matter. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments. As used herein, the terms "about" or "approximately" may refer to values that are, for example, within ±10% of a given value or range of values.

As discussed above, current methods for inspecting components can be slow and labor intensive. Further, the inspection of components is typically limited to only about 1% or less of the surface area of the component. Therefore, various aspects of the disclosed subject matter improve inspection capabilities of components by increasing a magnified inspection area of each component, in each stage of the fabrication of the component, at up to 100% of the entire surface area of the component. By inspecting 100% of the component, a defect detection value is increased to a confidence level of 95% or better (e.g., a 97% confidence level, a 99% confidence level, etc.). As will be understandable to a person of ordinary skill in the art, upon reading and understanding the disclosed subject matter, portions of the component that are not proximate to a substrate undergoing a semiconductor process may not require inspection. For example, an outer portion of a window that is not in contact with an interior portion of a process chamber in a semiconductor processing tool may not be inspected since the outer portion can have no effect on the substrate undergoing processes within the chamber.

Figure 1:
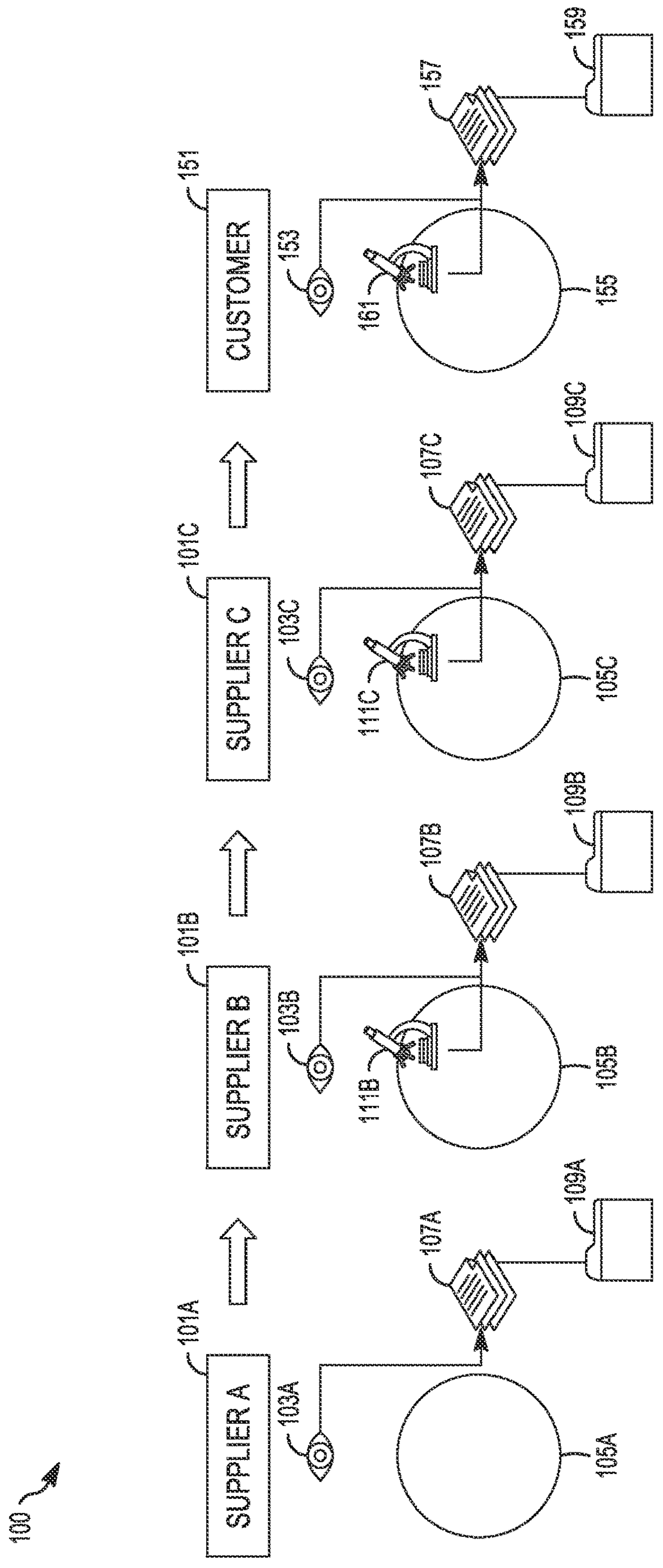
FIG. 1 (PRIOR ART)
FIG. 1 shows a high-level overview of current inspection procedures currently performed under the prior art.
Figure 2:
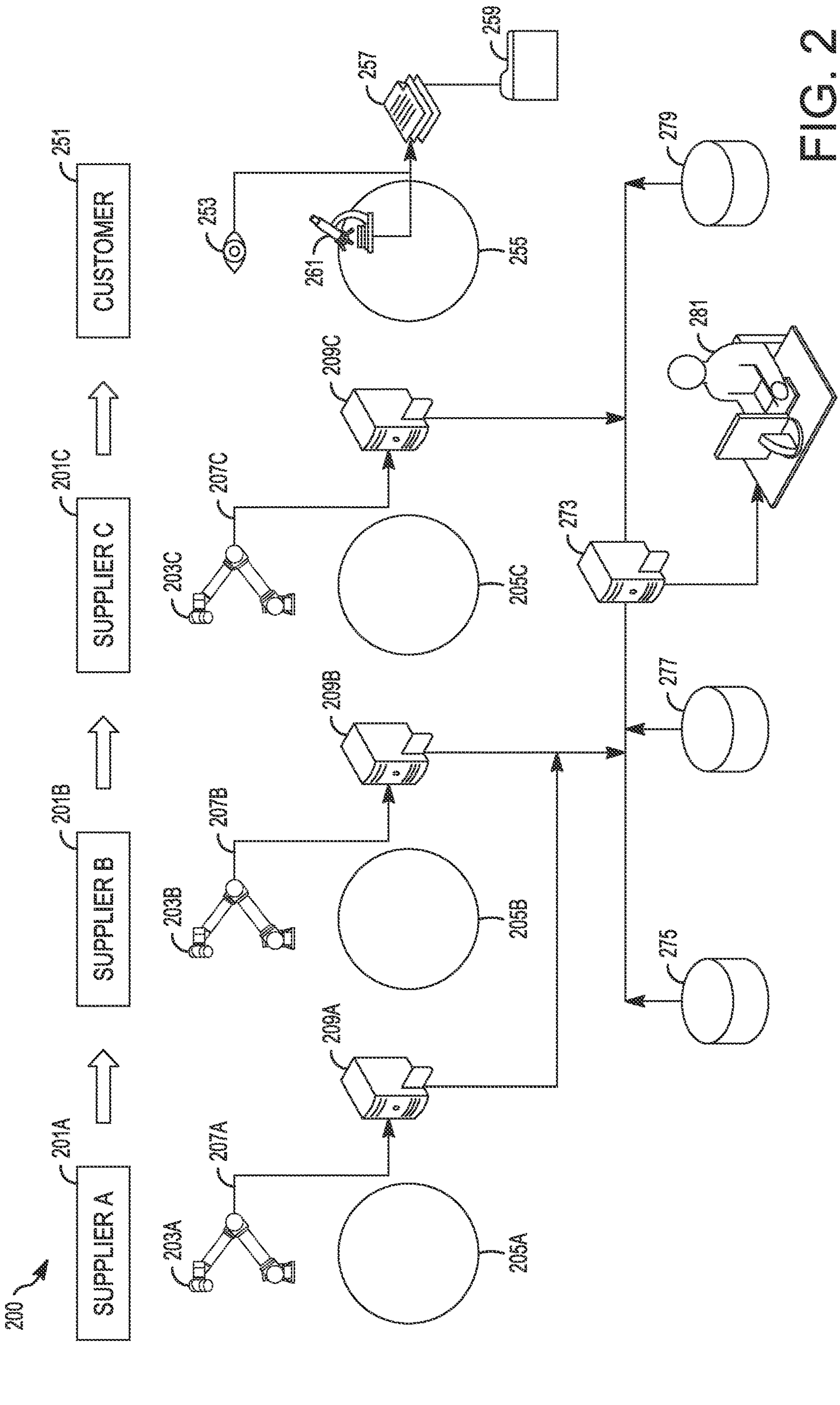
FIG. 2 shows an example of a high-level overview of an automated inspection system in accordance with embodiments of the disclosed subject matter.

With reference now to FIG. 2, an example of a high-level overview of an automated inspection system 200 in accordance with embodiments of the disclosed subject matter is shown. FIG. 2 is shown to include a number of suppliers 201A through 201C (or various processes within the facilities of the one or more suppliers). For example, an original version of the component 205A may be fabricated (e.g., a milled or machined version of the component 205A) by the supplier 201A. An additional process (or processes) or fabrication step (or steps) may be performed thereby forming component 205B. The additional processes or fabrication steps may comprise, for example, a plating operation such as forming a coating or plating over the component 205A by the supplier 201B. The component 205B then undergoes an additional process (or processes) or fabrication step (or steps) with the supplier 205C. The additional processes or fabrication steps performed by the supplier 201C may comprise, for example, a milling, grinding, buffing or other operation. Each of the additional processes or fabrication steps may be carried out by various suppliers and/or different facilities within facilities of one or more suppliers. In a typical manufacturing operation, a serial number associated with a given component may remain constant, but the part number can vary depending upon what stage the component is at in the process (e.g., the part number may change after was coating or plating operation). Therefore, there can be several (e.g., eight, nine, or more) part numbers for a given component but the serial number remains constant. Further, although only three "suppliers" are shown, a person of ordinary skill in the art will recognize that as few as one or any number of "suppliers" may be involved in preparing a component.

With continuing reference to FIG. 2, each of the of the suppliers 201A through 201C includes a robotic-inspection station 203A through 203C. The robotic-inspection stations 203A through 203C are described in more detail with reference to, for example, FIGS. 3A and 3B, below. However, in general the robotic-inspection stations 203A through 203C include a robot having one or more cameras and one or more lens combinations (not shown in FIG. 2 but described below with reference to FIGS. 3A and 3B) mounted on a portion of the robot opposite to a portion to which the robot is mounted to an inspection table (also not shown in FIG. 2). That is, the one or more cameras and one or more lens combinations is mounted on a free end of the robot that is distal from the mounted portion of the robot. The robot of each of the robotic-inspection stations 203A through 203C has multiple joints (e.g., six, seven, eight, or more joints), and consequently, multiple degrees-of-freedom. The multiple degrees-of-freedom allow the robots to inspect surfaces of a component 205A through 205C during various stages of the fabrication. For example, although the components 205A through 205C shown in FIG. 2 appear as circular, flat parts, each of the components 205A through 205C may have one or more three-dimensional features (e.g., see FIG. 3A). Consequently, the robot can be programmed to scan at a pre-determined distance from vertical, horizontal, and other orientations of surfaces on the components 205A through 205C.

Each of robotic-inspection stations 203A through 203C are electronically coupled through a respective communications medium 207A through 207C to a respective one of the local data-collection stations 209A through 209C. Respective one of the communications medium 207A through 207C may carry, for example, serialized inspection images for multiple regions of the components 205A through 205C as images are collected of the components 205A through 205C by the robot.

The communications medium 207A through 207C may be either wired or wireless, using communications techniques and protocols known in the art. The respective ones of the local data-collection stations 209A through 209C may comprise a personal computer, a tablet computer, a programmable logic-controller (PLC), a microprocessor coupled to a storage-memory device, or other types of processing devices known in the art. Some types of processing devices are described in more detail below with reference to FIG. 7. Further, methods of storing and analyzing data collected from each of the robotic-inspection stations 203A through 203C on the local data-collection stations 209A through 209C is described in detail below with reference to FIGS. 5A through 5G and FIGS. 6A through 6C.

Once the final version of the component (e.g., a completed component 255) has been fabricated, a customer 251 or end user of the completed component 255 may perform additional inspections. For example, a visual inspection 253 and a detailed level of inspection 261 may be performed on the completed component 255. The detailed level of inspection 261 may be accomplished through various inspection means known in the art such as by microscopy, optical profilometry, stylus-based profilometry, or other techniques, including analytical techniques such as energy-dispersive X-ray spectroscopy (EDX) or X-ray fluorescence (XRF)—both of which are known in the art. In some cases, the detailed level of inspection 261 may be supplemented by a roughness measurement of the completed component 255. In other cases, only a roughness measurement of the completed component 255 is performed. In accordance with process-control procedures of the customer 251, quality-control documentation 257 may be generated. The quality-control documentation 257 may then be stored locally in a file database 259.

As shown in FIG. 2, each of the local data-collection stations 209A through 209C is coupled to a remotely-based master data-collection station 273. The master data-collection station 273 may comprise a personal computer, a tablet computer, a microprocessor coupled to a storage-memory device, or other types of processing devices known in the art. Further, the master data-collection station 273 may geographically be located in a different region or country from each of the local data-collection stations 209A through 209C. However, in various embodiments, each of the local data-collection stations 209A through 209C and the remotely-based master data-collection station 273 is in electronic communication with each other. In other embodiments, each of the local data-collection stations 209A through 209C is in electronic communication with only the remotely-based master data-collection station 273. Further, a data fabric, discussed in more detail below with reference to FIGS. 5A through 5G, can be accessible to only the remotely-based master data-collection station 273 or to each of the local data-collection stations 209A through 209C and the remotely-based master data-collection station 273.

In a specific exemplary embodiment, the master data-collection station 273 may be located within a facility of an original-equipment manufacturer (OEM) of, for example, a process tool for which a final form of the component 205A through 205C is to be used. In this embodiment, the OEM location may include a number of databases storing information that can be used to analyze usage of the final form of the component 205A through 205C.

For example, a process-monitoring database 275 may contain metrics based on image quality for how a “golden sample” (e.g., an idealized sample) for each step in the fabrication process corresponding to different stages of completion of the components 205A through 205C should appear. The metrics of image quality are then compared, in substantially real-time, to fabrication steps for the different stages of the components 205A through 205C for each of the suppliers 201A through 201C. As described in more detail below, manufacturing or fabrication process monitoring software (e.g., the data fabric) gathers machine performance, and a resulting component variation from a comparison of the golden sample with the components 205A through 205C to analyze manufacturing trends in substantially real-time. The comparison may be performed for all parameters being measured (e.g., roughness values, defect level, dimensional variations from planned dimensions, etc.) over any specified time interval or fabrication step. Consequently, at various stages in the fabrication process, the golden sample provides a comparison to part variation, defect performance (including particles (or bumps) and pits (or depressions)) by each node within the supply chain (e.g., from one supplier to another selected from within the suppliers 201A through 201C, and control charting of each components including a time dependency (e.g., statistical process control (SPC)). The comparison is then monitored for variations that fall outside of a pre-determined level of variation or a pre-determined tolerance value.

With continuing reference to FIG. 2, an escalation-solver database 277 provides additional input to the master data-collection station 273. The escalation-solver database 277 can provide possible solutions to be transmitted to an appropriate one of the suppliers 201A through 201C if the comparison of the component with the process-monitoring database 275 fails to meet specifications within the pre-determined variation and tolerance limits.

A customer-defect data database 279 correlates defects produced within, for example, a process tool in which the completed component 255 was installed. For example, in a specific exemplary embodiment, if the completed component 255 represents a showerhead installed in a plasma-based process tool, the customer-defect data database 279 can maintain records of substrates processed using the showerhead. If the customer-defect data database 279 indicates that particles are shedding from the showerhead and forming on the processed substrate, the customer-defect data database 279 can transmit an indication to the master data-collection station 273. An operator 281 of the master data-collection station 273 can then correlate how the fabrication process of the showerhead may have produced the particles that were shed from the showerhead. The correlation, as described in more detail below, can help to determine which process or processes produced the defective showerhead. In some examples, the correlation can also be used to generate additional metrics and measurements that may need to be incorporated by one or more of the suppliers 201A through 201C.

In other examples, the customer-defect data database 279 can correlate defects produced on a processed substrate to interactions from multiple ones of the completed components 255. In this example, the customer-defect data database 279 may indicate that defects on the substrate are generated from a combination of the multiple ones of the completed components 255. Continuing with this example, the operator 281 of the master data-collection station 273 can attempt to correlate the defects on the substrate with various ones of the fabrication steps performed by the various ones of the suppliers 201A through 201C. However, the operator 281 may determine that the components 205A through 205C fully conformed with the pre-determined variation and tolerance limits at all fabrication steps (e.g., as compared with the golden sample) of the process-monitoring database 275. In this case, the operator 281 may determine that one or more of the completed components 255 was improperly installed at a site of the customer 251. In still other examples, the operator 281 may determine that the components 205A through 205C fully conformed with the pre-determined variation and tolerance limits at all fabrication steps, and that one or more of the completed components 255 was properly installed at a site of the customer 251. In this case, a revised set of pre-determined variation and tolerance limits may be needed to correspond to a new technology node (e.g., a reduction in minimum design-rules).

In various embodiments, comparisons between, for example, different suppliers, comparisons between specific part numbers and/or serial numbers, and comparisons between different time periods (shift-to-shift, day-to-day, year-to-year, etc.) may be performed. For example, in a typical manufacturing operation, a serial number associated with a given component may remain constant, but the part number can vary depending upon what stage the component is at in the process (e.g., the part number may change after was coating or plating operation). Therefore, there can be several (e.g., eight, nine, or more) part numbers for a given component but the serial number remains constant. Various embodiments of the disclosed subject matter described herein can monitor and can account for each of the potential variations.

Based on analysis performed by the inventors, they have estimated that a ten-fold reduction in labor will be realized by incorporating various embodiments of the disclosed subject matter using the automated inspection system 200. For example, currently a total inspection time for a given component is approximately 120 minutes (two hours). However, as noted above, current inspection systems only inspects approximately 1% of the component. By using the systems and techniques described herein, a 100% inspection can be accomplished within, in a specific exemplary embodiment, approximately 12 minutes to 25 minutes.

Further, although only three suppliers are shown in FIG. 2 (the suppliers 201A through 201C), a person of ordinary skill in the art, upon reading and understanding the disclosed subject matter, will recognize that the disclosed subject matter may be applied to any number of suppliers as well as multiple processes or steps performed by a given supplier.

Figure 3A:
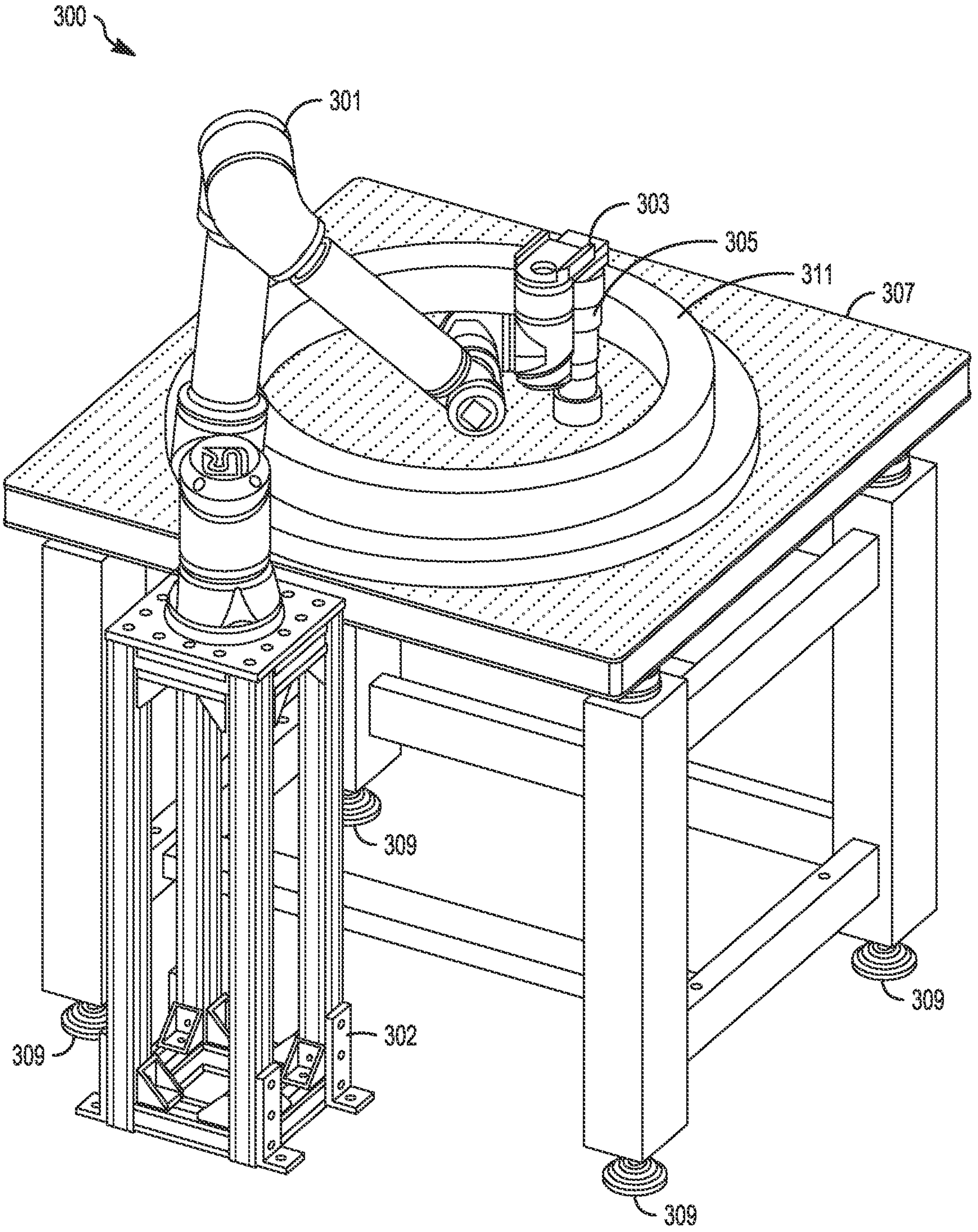
FIGS. 3A and 3B show examples of automated-inspection stations in accordance with embodiments of the disclosed subject matter.
Figure 3B:
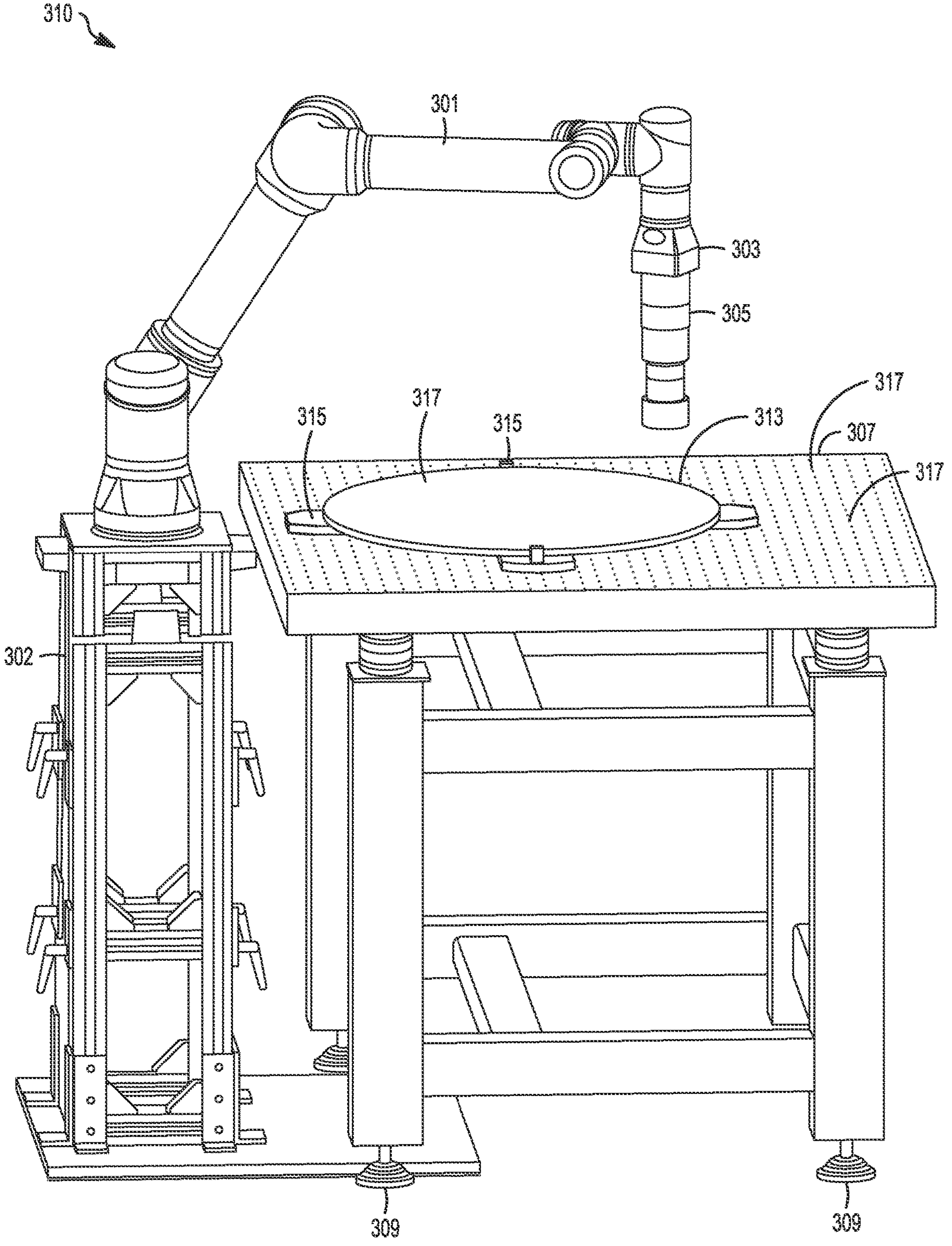

Referring now to FIGS. 3A and 3B, examples of automated-inspection stations in accordance with embodiments of the disclosed subject matter are shown. For example, FIG. 3A shows a predominantly top-quarter-view of a robotic station 300. The robotic station may the same as or similar to the robotic-inspection stations 203A through 203C of FIG. 2. FIG. 3A is shown to include a robot 301, a sensor 303 mounted to a distal end (opposite the mounted end) of the robot 301, and a lens 305 mounted to the sensor 303.

As is understood by a person of ordinary skill in the art, lens-based inspection systems using the lens 305 to collect light reflected from an object (e.g., a component 311). A skilled artisan recognizes that the Rayleigh limit-of-resolution, $L_R$, (how small of feature a lens-based system may resolve) is based on the following equation:

$$L_R = \frac{0.61 \cdot \lambda}{NA}$$

where λ is the wavelength of the light used to illuminate the object, and NA is the numerical aperture of the lens. NA is related to the refractive index of a medium between the lens and the object, and the angle-of-light entering the lens:

$$NA = n \cdot \sin\theta$$

where n is the index-of-refraction of the medium in which the lens is operating (e.g., n is about equal to 1.00 for air, equal to about 1.33 for water, and equal to about 1.52 for high-refractive-index immersion oils); and θ is a maximal half-angle of a cone-of-light that can enter (or exit) the objective lens. Therefore, as the numerical aperture, NA, increases, the limit-of-resolution, $L_R$, decreases, thereby allowing inspection of smaller features, such as defects.

However, as NA increases, the depth-of-field (e.g., image depth) and the viewable area decreases significantly. For example, the depth-of-field, DOF, decreases by the square of the numerical aperture, NA, according to the following equation:

$$DOF = \frac{n \cdot \lambda}{NA^2}$$

Consequently, as the limit-of-resolution decreases (allowing interrogations of increasingly smaller feature sizes), the depth-of-field decreases even faster. The viewable area also decreases commensurately. Therefore, the disclosed subject matter presents a system that allows inspection of small features on the component 311 but with a large depth-of-field and covering a large inspection area in a limited time period.

With reference again to FIG. 3A, the robot 301 is mounted to a robot stand 302. In various embodiments, the robot stand 302 may have an uppermost height that is substantially co-planar with an uppermost height of a mounting table 307. However, there is no co-planarity requirement. For example, in some embodiments, the uppermost height of the robot stand 302 may be arranged to be above the uppermost height of the mounting table 307. In other embodiments, the uppermost height of the robot stand 302 may be arranged to be below the uppermost height of the mounting table 307.

The mounting table is arranged to hold the component 311 that is to undergo inspection from the combination of the robot 301, the sensor 303, and the lens 305. The component may the same as or similar to one of the components 205A through 205C of FIG. 2. The component 311 may be held in place on the mounting table 307 by any one or more of various fixture types, including, for example, mechanical fixtures and magnetic fixtures. As shown in FIG. 3A, the robot 301 can position the sensor 303 and the lens 305 in proximity to various surfaces (e.g., whether horizontally or vertically oriented) of the component 311 that are not facing the mounting table 307 directly. However, the component 311 can be repositioned such that faces originally positioned to face the table can now face away from the table if a more complete inspection of the component 311 is desired. The positioning of the sensor 303 and the lens 305 is accomplished by the robot 301 rotating and/or extending one or more of multiple joints that comprise portions of the robot 301.

The robot 301 has multiple links to provide multiple degrees-of-free dom. In an exemplary embodiment, the robot 301 comprises a collaborative robot or "cobot." A cobot is a type of robot that is specifically designed to work safely in close proximity to areas shared between the cobot and humans. The safety aspect of the cobot comes from using lightweight materials in the construction of the cobot and/or imposing limits on speed and force of the cobot movement. For example, the amount of force may be limited to about 50 Newtons (approximately 11.2 pounds-force (lbf)) with a torque limit of about 10 N-m (approximately 7.4 ft-lbf).

In a specific exemplary embodiment, the robot 301 may comprise a model UR5e cobot, manufactured by Universal Robots (available from Energivej, 25 DK-5260 Odense S, Denmark). In this embodiment, the robot 301 has a maximum payload of about 5 kg (approximately 11 pounds-mass (lbm)), a reach of about 850 mm (approximately 33.5 inches) and has six rotatable-joints. Each of the six rotatable-joints has a working range of about ±360 degrees with a maximum speed of about 180° per second. As a cobot, the robot 301 has 17 configurable safety functions split between hardware and software in this embodiment. Further, the robot 301 in this embodiment is certified to operate in a Class 5 cleanroom in accordance with the ISO 14644-1 standard for the classification of air cleanliness.

The robot stand 302 can be comprised of a number of materials as is understandable to a person of ordinary skill in the art upon reading and understanding the disclosed subject matter. Such materials include, for example, aluminum and aluminum alloys, various types of metals, and various types of plastics. Further, as shown in FIG. 3A, the mounting table 307 includes a number of vibration-absorbing feet 309. The vibration-absorbing feet 309 help to at least partially isolate the component 311 from a transference of external vibrations that might otherwise blur or obscure images receiving from the component 311 by the sensor 304. In other embodiments, the robot stand 302 may comprise a portion of the mounting table 307 itself (e.g., the robot stand 302 may be one end of the mounting table 307, in which case the robot stand 302 is not a separate element).

The sensor 303 may comprise various types of sensors known in the art. For example, in various embodiments, the sensor 303 may be an active-pixel sensor, such as a CMOS-based sensor, a CCD-based image sensor, or other types of digital-imaging sensor. The various types of sensors may include sensors that are sensitive to light emanating from within the visible spectrum, from wavelengths emanating in the ultraviolet regions, from wavelengths emanating in the near-infrared and/or infrared regions, or sensors that are sensitive to one or more of the aforementioned wavelength-regions. Some of these sensor types may also be selectable to be operated within one or more pre-determined limited wavelength-ranges (e.g., a selectable wavelength bandpass) of interest.

In a specific exemplary embodiment, the sensor 303 comprises a CMOS-based camera. One CMOS-based camera that has been found to be suitable is the Genie Nano-1GigE camera (available from Teledyne Dalsa, 605 McMurray Road, Waterloo, Ontario Canada N2V 2E9). The sensor 303 is discussed in more detail with reference to FIG. 4A, below.

The lens 305 may comprise any number of imaging lenses. The lens 305 can be selected for a desired magnification, field-of-view, transmission value (e.g., T-stop), imaging distance, and other desirable attributes. A person of ordinary skill in the art will recognize how to select desirable attributes for the lens 305 based upon reading and understanding the disclosed subject matter.

In a specific exemplary embodiment, the lens 305 is a Moritex bi-telecentric lens, model number MTL-3535P-100 (available from MORITEX Corporation, 3-13-45 Senzui Asaka-shi, Saitama, 351-0024, Japan). In this embodiment, the lens has a diagonal field-of-view of about 35 mm, an image format of about 35 mm, and a magnification of about 1×. For the specific exemplary embodiment of the lens 305 and the sensor 303 combination described herein, the magnification of about 1× represents an equivalent of approximately a 20× optical-inspection system (e.g., a microscope).

The mounting table 307 may comprise any one of a number of various types of mechanically-stable tables that are capable of substantially-rigidly holding the component 311. In various embodiments, the mounting table 307 may comprise an optical table, known in the relevant art. Optical tables typically include a number of threaded mounting holes, spaced about 25.4 mm (approximately 1 inch) apart in both x- and y-directions. The mounting holes are, for example, suitable for threading ISO-standard M6×1 (approximately ¼ inch−20) or similar screws in order to mechanically mount the component 311 to the mounting table 307.

Various types of calibration standards, known in the art, may be used to monitor both the health of the AVI system and detect if there are any components out of tolerance. The calibration standards may also be used to bring the AVI system back into tolerance if, for example, the robot becomes un centered with respect to the location of the center of the part or table. The calibration may comprise a geometric-based calibration standard employed in machine vision fields. The calibration standard may be permanently affixed, for example, to the mounting table 307.

In a specific exemplary embodiment, the mounting table 307 is an optical table, Nexus model B3636T (available from ThorLabs, 56 Sparta Avenue, Newton, New Jersey 07860, United States of America). The model B3636T is considered a breadboard optical-table that, in this example, is a square table of about 914 mm (approximately 36 inches) on a side that is 60 mm (approximately 2.4 inches) thick. Appropriate legs may be added to place the mounting table 307 at a desired height.

With reference now to FIG. 3B, a predominantly side-view 310 of the robotic station 300 of FIG. 3A is shown. FIG. 3B is shown to include a substantially-flat component 313 having substantially planar features. In one example, the substantially-flat component 313 may comprise a window for a plasma-based processing chamber. In this example, the window may comprise various materials such as aluminum oxide ($Al_2O_3$), zirconium oxide ($ZrO_2$), silicon dioxide ($SiO_2$), and other ceramic, quartz, or glass materials known in the art. The substantially-flat component 313 is mounted to the mounting table by a number of fixtures 315 that may be fastened to mounting holes 317 in the mounting table 307.

In various embodiments, the robot 301 is arranged to perform a 100% inspection of the substantially-flat component 313 (or any other component) at a magnification of 1× using the robot 301, the sensor 303, and the lens 305 combination. In this embodiment, the robotic station 300 has a spatial pixel-resolution of about 4.5 μm. A total number of images collected from the substantially-flat component 313 will be dependent on several factors including, for example, an overall surface area of the component under inspection as well as a pre-determined amount of overlap of each image. For example, in one embodiment, an overlap of images may be selected to be from 0% overlap (no overlap of subsequent images) to an overlap of about 50% in both x- and y-directions. In some embodiments, an overlap of images may be selected to be from 5% overlap to an overlap of about 10% in both x- and y-directions. In still other embodiments, an overlap may be selected based on radial coordinates (e.g., r and ϕ). In these embodiments, an overlap of images may be selected to be from, for example, about 0% overlap to an overlap of about 50% in both r- and ϕ-directions. For three-dimensional objects, a person of ordinary skill in the art will recognize, upon reading and understanding the disclosed subject matter, that overlaps may be selected based on x-, y-, and z-directions in Cartesian-coordinate systems, r-, ϕ-, and z-directions in Cylindrical-coordinate systems, r-, ϕ-, and φ-directions in Spherical-coordinate systems, various other coordinate systems, or various combinations of the above coordinate systems.

Each of the various defect types detected by the robotic station 300 can be classified into a variety of defect sizes. In one example, defects may be classified in binned sizes of up to about 15 μm, 20 μm, 50 μm, 100 μm 420 μm, and 900 μm, or down to, for example, 1, 5, or 10 microns for higher magnification embodiments. Of course, a person of ordinary skill in the art will recognize that any number of bins and bin sizes may be selected depending upon a particular application of the robotic station 300. Techniques and methods for binning defects are discussed in more detail with reference to FIGS. 6A through 6C, below.

Figure 4A:
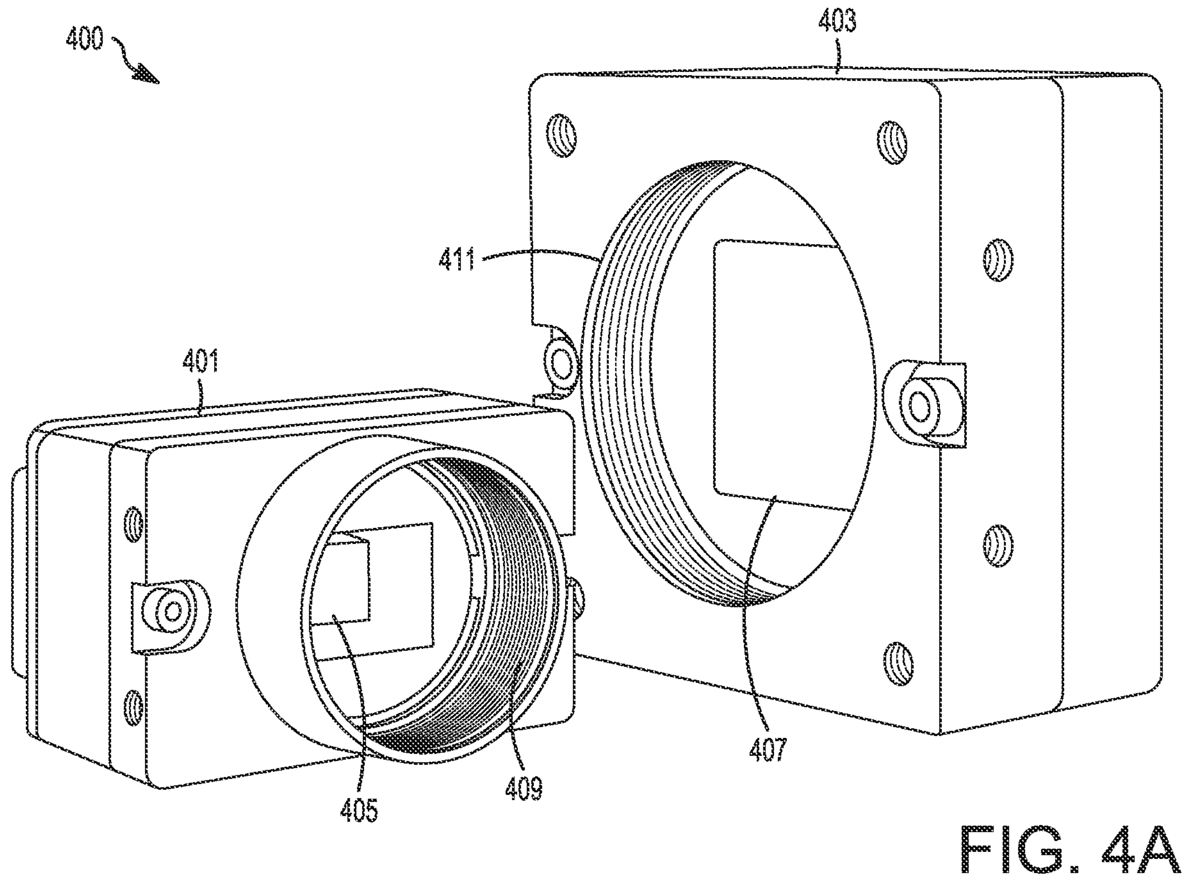
FIGS. 4A through 4C show embodiments of various inspection-camera sensors and lens assemblies in accordance with embodiments of the disclosed subject matter.
Figure 4B:
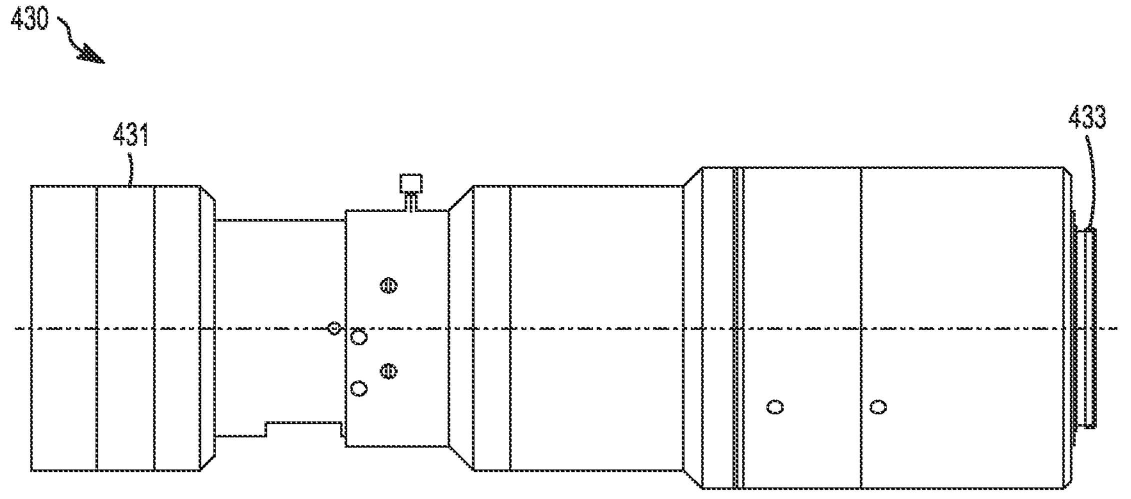
Figure 4C:
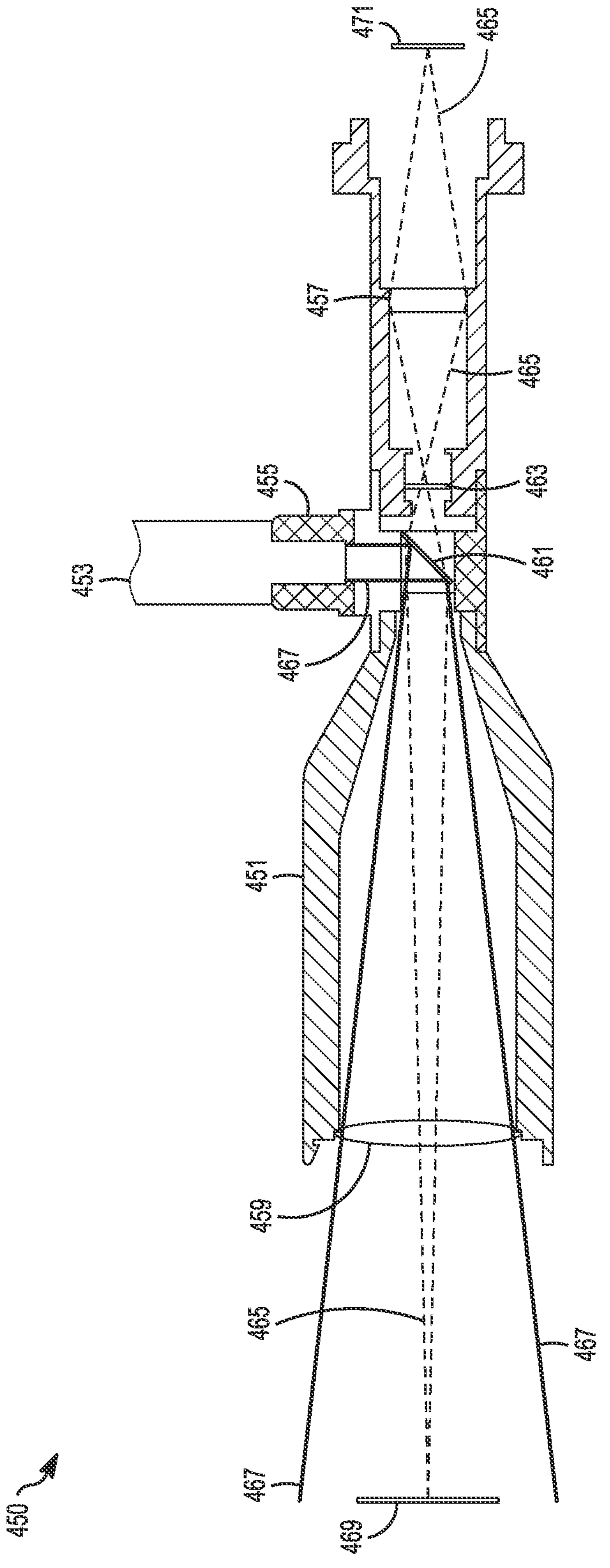

FIGS. 4A through 4C show embodiments of various inspection-camera sensors 400 and lens assemblies 430, 450 in accordance with embodiments of the disclosed subject matter. With reference to FIG. 4A, a small-sized camera 401 and a large-sized camera 403 are shown. Each of the cameras 401, 403 may be the same as or similar to the sensor 303 discussed above with reference to FIGS. 3A and 3B. Further, each of the cameras 401, 403 includes a number of input/output (I/O) ports located on a backside (not shown) of the respective cameras 401, 403. The I/O ports may include, for example, one or more opto-coupled ports and RJ-45 ports, both known in the art.

In an exemplary embodiment, the small-sized camera 401 includes a CMOS-based sensor 405 having a resolution of, for example, 672×512 pixels with a 4.8 μm pixel size, and having a frame rate of, for example, 350 frames per second (fps). In an exemplary embodiment, the large-sized camera 403 includes a CMOS-based sensor 407 having a resolution of, for example, 5120×5120 pixels and a 4.5 μm pixel size, with a frame rate of, for example, 4.6 frames per second (fps). Based on upon reading and understanding the disclosed subject matter, person of ordinary skill in the art will recognize how to determine which camera is desired for selecting a given set of imaging parameters desired.

The small-sized camera 401 includes a lens mount 409 suitable for mounting a particular type of lens, having an imaging circle sufficient to cover or substantially cover an imaging area of the CMOS-based sensor 405. The large-sized camera 403 includes a lens mount 411 suitable for mounting a particular type of lens, having an imaging circle sufficient to cover or substantially cover an imaging area of the CMOS-based sensor 407. In this exemplary embodiment shown in FIG. 4A, one of the lens mounts 409, 411 is a metric M42 Praktica® or P-thread mount. In other embodiments, other types of lens mounts 409, 411 known in the art may be used (e.g., C-mount, CS-mount, or various types of bayonet mounts). Since the CMOS-based sensor 407 uses an interchangeable lens-mounting system, any number of lens types, having different magnification, transmission abilities, physical sizes, and so on, may be selected.

FIG. 4B shows a lens assembly 430 that may be used with the inspection-camera sensors 400 of FIG. 4A. The lens assembly 430 may be the same as or similar to the lens 305 of FIGS. 3A and 3B. The lens assembly 430 is shown to include a P-mount threaded flange 433 and a front-element portion 431. The front-element portion 431 of the lens assembly 430 is the portion of the lens assembly 430 that is proximate to the area of the component (e.g., the component 311, 313 of FIGS. 3A and 3B, respectively) being inspected on the robotic station 300.

FIG. 4C shows a telecentric lens 450. The telecentric lens 450 may be the same as or similar to the lens assembly 430 of FIG. 4B and/or the lens 305 of FIGS. 3A and 3B. The telecentric lens 450 integrates an illumination source 453, and a light output 467 generated by the illumination source 453, directly into the optical train of the telecentric lens 450. The telecentric lens 450 thereby provides in-line illumination wherein light rays reflected from an imaged object 469 are substantially parallel to the light output 467 within the telecentric lens 450. The telecentric lens 450 therefore is able to focus light rays 465 (only one light ray is shown for clarity) that are reflected from the imaged object 469 onto an image plane 471 (such as the CMOS-based sensor 405, 407 of FIG. 4A).

FIG. 4C is also shown to include a lens barrel 451, an illumination-source coupling 455, a lens rear-element 457, a lens front-element 459, an aperture 463, and a beam splitter 461.

The aperture 463 (or field stop) may be fixed or variable and serves physically to limit a solid angle of the light rays 465 passing through the telecentric lens 450. The aperture 463 may be used to reduce light intensity being passed through the telecentric lens 450 to the image plane 471 and/or increase a depth-of-field (by reducing a cross-sectional area of the aperture 463) of the imaged object on the image plane 471.

The beam splitter 461 redirects the light output 467 generated by the illumination source 453 to be substantially in-line with the light rays 465 reflected from the imaged object 469. The beam splitter 461 may comprise, for example, a pellicle mirror (a thin, semi-transparent mirror element) or a pair of triangular glass prisms glued or otherwise adhered together. In an exemplary embodiment, the beam splitter 461 comprises birefringent materials to form a polarizing beam-splitter to split incoming light into two beams of substantially-orthogonal polarization states.

In various embodiments, the illumination source 453 may comprise a light from various light sources, such as, for example, a high-intensity halogen beam or light-emitting diode (LED). The light sources may comprise a selected wavelength or range of wavelengths. The light source may then be transmitted to the illumination-source coupling 455 through a fiber optic element or other type of transmission device (e.g., optical elements).

A person of ordinary skill in the art will recognize that the telecentric lens 450 may be substituted by another lens and illumination type of arrangement. For example, a number of non-telecentric lens types may be used with the robotic station 300 of FIG. 3A. However, illumination for the non-telecentric lens type may come from ambient light or another illumination source such as a ring light or other co-axial light source mounted on or near a front element portion (e.g., the front-element portion 431 of FIG. 4B or the lens front-element 459 of FIG. 4C), an externally-mounted beam splitter, or other types of direct and diffuse illumination sources known in the art. Also, although not shown explicitly in FIG. 4C, a polarized-light source (in any of the illumination scenarios discussed herein) may be used with an analyzer to detect other parameters of interest regarding defects detected on the component. Such techniques are known in the relevant art.

Consequently, due to the additional components that may be used, the non-telecentric lens type when combined with another illumination type may be less compact in physical size than the telecentric lens 450. However, for certain types of objects, the telecentric lens 450 may produce certain image aberrations (e.g., hotspots, which reduce image contrast) when imaging certain types of optically-diffuse objects. The optically-diffuse object can act as a Lambertian radiator, radiating light uniformly or nearly uniformly in all directions (or in a nearly constant bi-directional reflectance-distribution function (BRDF) as is known in the art). Consequently, the disclosed subject matter can be configured to use either in-line illumination (e.g., the telecentric lens 450) or a non-telecentric lens either with or without supplemental non-inline illumination sources.

Further, the skilled artisan will recognize that certain modifications may be made to the telecentric lens 450 or other type of non-telecentric lens. For example, if the illumination source 453 is selected to be a deep-ultraviolet (DUV) wavelength (e.g., about 248 nm or about 193 nm) or extreme-ultraviolet (EUV) wavelength (e.g., about 124 nm to about 10 nm) to increase a lower limit-of-resolution of the robotic station 300, then either specialized optical elements (having, for example, an extremely low-value of surface roughness) or reflective elements (e.g., front-surface mirrors) may be substituted for the optical elements described above. Also, inspection of components may be conducted under vacuum conditions since low wavelength emissions are not always transmittable through air.

FIGS. 5A through 5G show examples of graphical user-interfaces (GUIs) that can be used with various embodiments of the disclosed subject matter. Data may be stored either with a particular supplier (e.g., one of the suppliers 201A through 201C of FIG. 2) and/or at the master data-collection station 273 in a data fabric. The data fabric is used to store all information related to the components inspected and related data as discussed in more detail below. The data fabric may be backed up periodically to local and/or remote storage devices as is known in the relevant art.

Figure 5A:
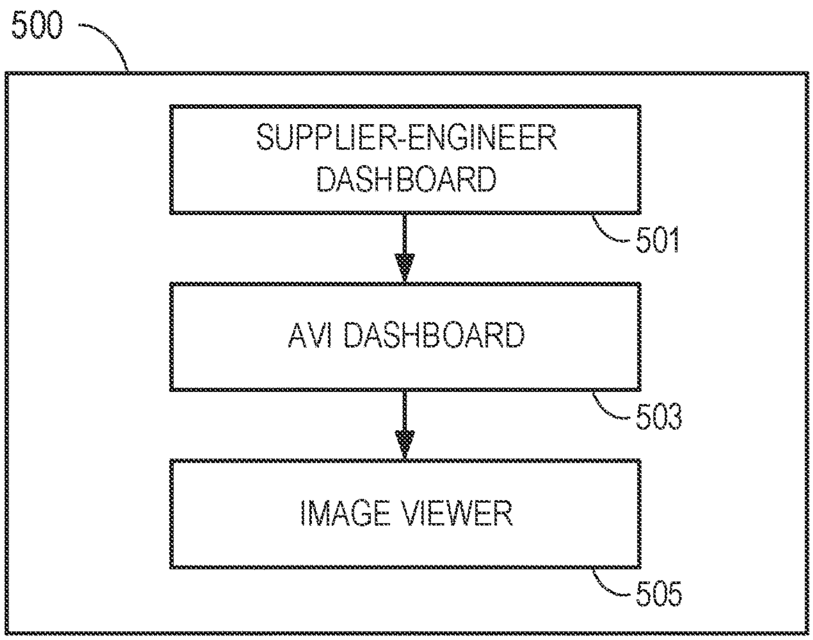
FIGS. 5A through 5G show examples of graphical user-interfaces (GUIs) that can be used with various embodiments of the disclosed subject matter.

With reference now to an exemplary embodiment shown in FIG. 5A, a top-level landing page 500 has three selectable-links. The three links include a supplier-engineer dashboard link 501, an automated visual-inspection (AVI) dashboard link 503, and an image-viewer link 505.

Figure 5B:
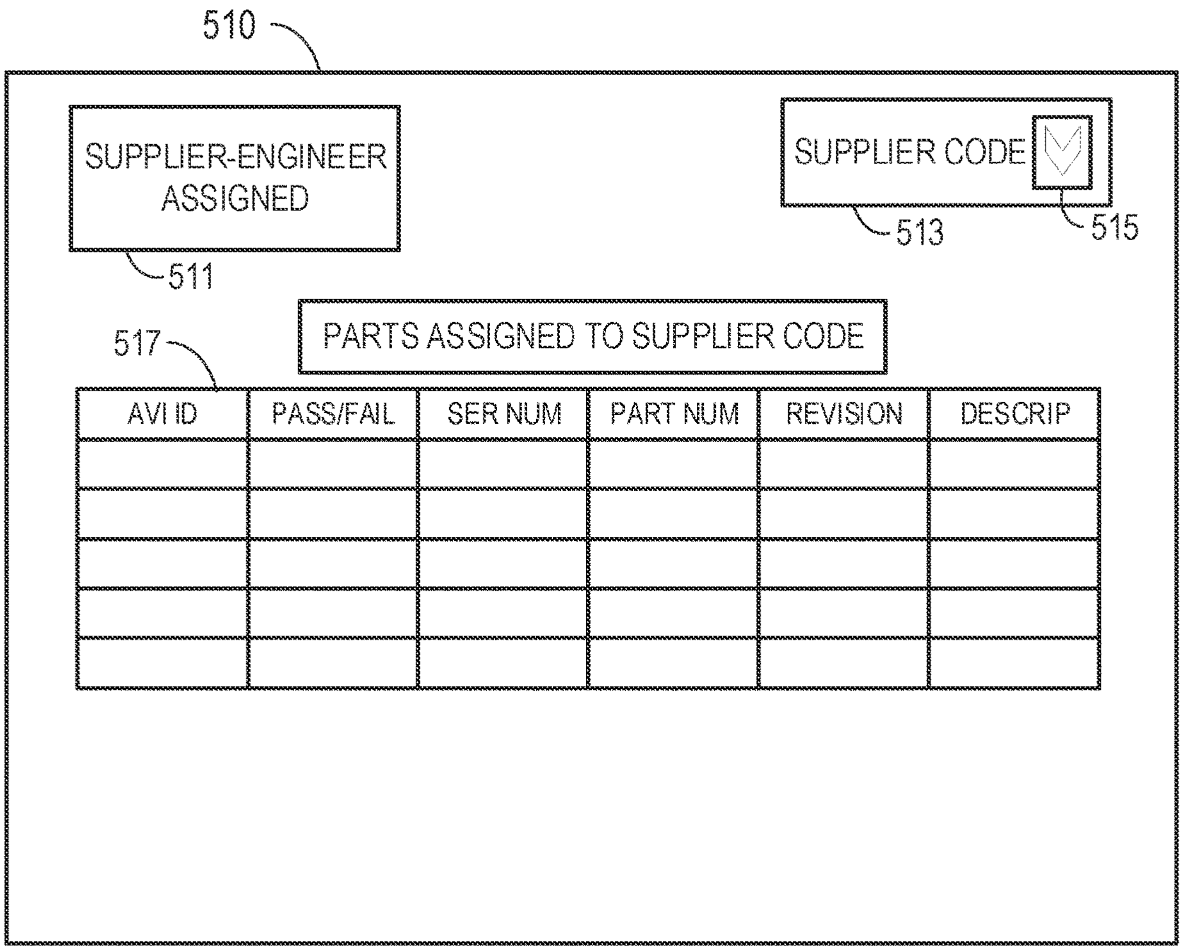

FIG. 5B shows an exemplary embodiment of a supplier-engineer dashboard 510 to which an end-user arrives after selecting the supplier-engineer dashboard link 501 from the top-level landing page 500. The supplier-engineer dashboard 510 is shown to include a supplier-engineer assigned block 511, a supplier-code block 513, a drop-down supplier-selection block 515, and a listing 517 of parts associated with an entered value in the supplier-code block 513.

The supplier-engineer assigned block 511 can be shown based on a direct entry of an assigned supplier-based engineer, or may be based on, for example, a drop-down box of engineer selections based on an entry into the supplier-code block 513, or various combinations thereof. Names of the assigned supplier-based engineer (e.g., a specific engineer or technician performing the inspection) may be stored in a previously supplied data file (e.g., in one specific exemplary embodiment, the data file may comprise a JavaScript Object Notation (JSON) file, which is a standard data interchange format, the structure of which is known in the art).

In a specific exemplary embodiment, the JSON file may be structured in three levels or more: Level 0, Level 1, and Level 2. In this embodiment, The Level 0 portion of the structure is configured to store details of all AVI records, as described herein. All AVI records are given unique identifier names by the data fabric. The Level 1 portion of the structure is configured to store image details for each image collected during the part or component inspection process described above, for example, with reference to FIG. 2. The Level 3 portion of the structure is configured to store defect details for each detected defect that is associated with a given image.

With reference again to the supplier-code block 513, in this embodiment, the supplier-code block 513 may comprise supplier codes listed as numerical identification values (IDs), at least one of which is previously assigned to each of a number of suppliers. The supplier code ID may be included as an attribute in the accompanying JSON file and has a specific supplier code value. The IDs supplied and shown within the supplier-code block 513 is selected from the drop-down supplier-selection block 515. In embodiments, selections available in the drop-down supplier-selection block 515 may be limited to a specific set of supplier codes found in an accompanying AVI database (e.g., as part of the JSON file). Additionally, parts assigned to the supplier within the supplier-code block 513 that have associated AVI data (e.g., as opposed to those parts that have not yet been inspected) can be identified based on, for example, a pre-defined color-coding or other highlighting scheme.

The listing 517 of parts associated with an entered value in the supplier-code block 513 can be used to display a complete list of parts (or components) that are assigned to a specific and selected supplier code. As indicated in FIG. 5B, the parts may be displayed by, for example, AVI ID number, whether the part has passed or failed an inspection step, a serial number of the part, the part number, a revision number (if more than one), and a description of the part. As will be recognizable to a person of ordinary skill in the art, upon reading and understanding the disclosed subject matter, any number of additional fields of interest may be added to or deleted from the listing 517 of parts. Further, various color codes may be used to highlight certain field of interest.

Figure 5C:
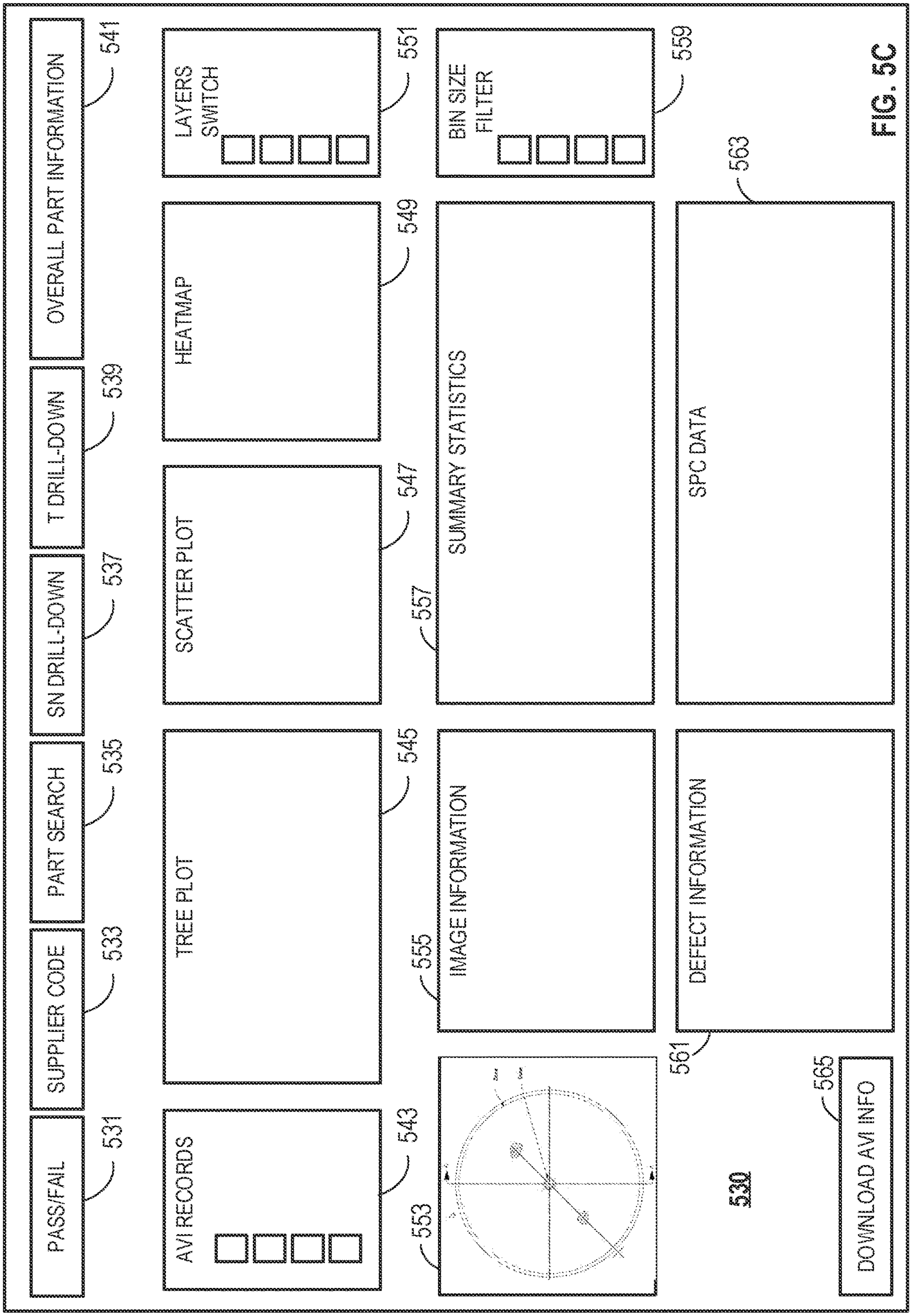

Referring now to FIG. 5C, an exemplary embodiment of an AVI dashboard 530 is shown to which an end-user arrives after selecting the AVI dashboard link 503 from the top-level landing page 500. The AVI dashboard 530 includes a number of selection blocks for a particular AVI file and a series of blocks to display information related to a selected AVI file. A determination for each of the parameters described in FIGS. 5C through 5G is described in more detail with reference to FIGS. 6A through 6C, below.

For example, the AVI dashboard 530 is shown to include a pass/fail block 531, a supplier-code block 533, a part-search block 535, a serial-number drill-down block 537, a time-series drill-down block 539, and an overall part-information block 541. The series of blocks to display information related to a selected AVI file includes a selection of AVI records block 543, a selection of layers-switch block 551, and a bin-size selection block 559. The series of blocks to display information related to the selected AVI file further includes an area to display tree plots 545, an area to display a scatter plot 547, an area to display a heatmap 549, an area to display a static image with zones 553, an area to display image information 555, an area to display summary statistics 557, an area to display defect information 561, and an area to display statistical process-control (SPC) data 563. Selected AVI data may be downloaded from the AVI dashboard 530 from a download AVI info block 565.

The supplier-code block 533 is used to search AVI records related to a specific one of the supplier codes. The source for supplier codes in this search can be based on data retrieved from a corresponding header field in the JSON files and stored in the data fabric, described above. In various embodiments, the supplier codes in this field may be augmented with the name of a corresponding supplier. Further, the selection of a value in the supplier code can be used to limit values in the remainder of the search fields to only those that correspond to the selected-supplier code. Similarly, changing a selection in the supplier code can be used to reset and clear values in the remaining search fields.

The part-search block 535 is used to search for parts that are stored in the AVI database. In embodiments, the part-search block 535 can display results in a dropdown mode using a typeahead approach, known in the art. Each character typed can be used to narrow down the search results. Parts appearing in a result set can have a check box listed against them, where the end-user can select any number of parts. Based on the parts that are selected, corresponding AVI records for those parts can be listed in the AVI records block 543.

The serial-number drill-down block 537 can be used to search for serial numbers listed in the AVI database. The serial-number drill-down block 537 can be used to display results in a drop down mode using a typeahead approach. Each character typed will be used to narrow down the search results. Serial numbers showing up in a result set can have a check box listed next to each serial number. In embodiments, the end-user can be limited to selecting a pre-determined number of serial numbers. Further, based on the serial numbers selected, the choices in the part-search block 535 can be limited to only the parts related to those particular serial numbers.

The time-series drill-down block 539 can be used to identify specific time periods based on a desired inspection date, work shift, or other time period when a part was inspected. The time-series drill-down block 539 can also be used for a range-based time search. An end-user can specify date ranges. Consequently, based on the particular parts within a given time period that are selected, choices in the part-search block 535 and the serial-number drill-down block 537 will be limited to only those parts that were inspected within the selected time period. Although not shown explicitly in FIG. 5C, the AVI dashboard 530 can also include a lot-number drill-down block that can be used to identify specific time periods based on lot information found within the selected serial numbers (or other selected parameters). For example, the lot information can comprise a selected week and/or year when a part or range of parts was inspected. The lot-number drill-down block can display results in a dropdown mode using a typeahead approach. Each character typed will be used to narrow down displayed search results.

For a selected AVI file, the pass/fail block 531 indicates whether the part associated with that file passed or failed inspection. Associated AVI records within the AVI file can include, for example, a pass/fail flag that is determined from a JSON header generated when the part was inspected. The pass/fail attribute can be used as a blanket criteria for all subsequent searches of the selection blocks described herein for a particular AVI file. In various embodiments, a default value of the pass/fail block 531 can be blank when the AVI dashboard 530 is loaded. If the value of the pass/fail block 531 remains blank, then the field has no bearing on remaining search criteria. If the value of the pass/fail block 531 is set to "pass," then only those AVI records that have a value set to "pass=true" will be available for search. If the value of the pass/fail block 531 is set to "fail," then only those AVI records that have a value set to "pass=false" will be available for search.

Displayed parts in the AVI records block 543, should list all the AVI records related to those parts found using, for example, the search criteria discussed above. In various embodiments, the AVI records block 543 may include field showing an AVI timestamp (e.g., when the part was inspected), a part number, a part revision (if any), and a process-of-record (POR) step. As shown, a check box can be shown next to each record. Once the box is checked, the AVI record information can be used for plotting and populating the remainder of the information in the AVI dashboard 530, as described in more detail below. In embodiments, a number of records that can be selected for plotting, may be pre-determined to only display a limited number (e.g., only three records may be plotted simultaneously). In embodiments, if one or more AVI records are checked for analysis, then all search filters described above can be locked to prevent further searching until after the records are unchecked. In this embodiment, after all AVI records are unchecked, the search filters can then be unlocked.

The area to display image information 555, the area to display summary statistics 557, the area to display defect information 561, and the area to display the SPC data 563 may each include various types of, for example, tabular information for a selected record or records. Such tabular information can include, for example, overall part information, summary statistics regarding the inspected part, information determined from the imaging process, and defect information determined from the imaging process.

For example, the area to display image information 555 can include column and row information (or other information displayed based on a selected coordinate system as described above) received from the inspection process, a total number of defects, a global position of the defects, and other types of information related to selected image data. The area to display summary statistics 557 can include, for example, serial number, part number, average defect area, a minimum detected-defect size, a maximum detected-defect size, an overall average position of the defects (e.g., clustered location of the defects), and other types of information related to selected image data. The area to display defect information 561 can include, for example, a global position for each of the detected defects, a local position for each of the detected defects, a surface area for each of the detected defects, an aspect ratio for each of the detected defects (including major and minor dimensions of the defects), a zone in which the detected defects are located, and other types of information related to selected image data. The area to display the SPC data 563 may include, for example, various types of statistical process-control data (e.g., box-whisker plots) that may be relevant to a given stage or aspect of a process. Such SPC parameters of interest are known to a person of ordinary skill in the art.

The static image with zones 553 displays a static image to help an end-user identify zones of interest on a selected part. For example, the end-user may choose to focus attention on a particular area of the inspected part.

The area to display tree plots 545 can be used to visually display which image has, for example, the highest number of defects based on a selected binning size. For example, a size and/or color of each box in the tree plot can be based on parameters such as an aggregated count of defects at each level. Tree plots are discussed in more detail with reference to FIGS. 5D and 5E, below.

The area to display a scatter plot 547 can be used to visually display a local scatter plot 590, as described in more detail with reference to FIG. 5F below. The scatter plot 590 can be based on, for example, defect details for a given image. Parameters of each of the defect in the image can include a local x-location, a local y-location (or other coordinate system parameters), and an area of each defect. Parameters such as these may be used to construct a related scatter plot 590.

The area to display a heatmap 549 can be used to visually display a heatmap 595, as described in more detail with reference to FIG. 5G below. Data collected from each image in a selected AVI record can be used to construct the heatmap 595. The heatmap 595 shows a global x-location and global y-location (or other coordinate system parameters) of a defect with reference to the location of each detected defect on the selected part.

The selection of layers-switch block 551 can include functionality relating to, for example, the area to display a scatter plot 547 and the area to display a heatmap 549. If there is more than one AVI record that is chosen for analysis in the scatter plot 590 or the heatmap 595, then the selection of layers-switch block 551 can allow an end-user to switch the area to display heatmap 549 and/or the area to display the scatter plot 547 on or off for a particular AVI record. In an exemplary embodiment, the selection of layers-switch block 551 may be adjusted to allow a maximum of three records to be loaded concurrently.

The bin-size selection block 559 can be a global filter on the AVI dashboard 530 that can be selected to affect only, for example, the area to display tree plots 545, the area to display a scatter plot 547, the area to display a heatmap 549, and the area to display defect information 561 sections of the AVI dashboard 530. The global filter of the bin-size selection block 559 can be arranged to consider only detected defects of a certain size based on the bins when rendering each of the plots or tabular information shown.

For example, within each defect record in the JSON file, an attribute named "bin" can be included that corresponds to a size or range of sizes for each detected defect. The "bin" attribute in the JSON file can be assigned a numeric value. Table I shows an example of mappings between a bin number and an associated name. A person of ordinary skill in the art, however, will recognize, based on upon reading and understanding the disclosed subject matter, that any number of bins and any number of name identifiers (e.g., based on a detected defect size) may be selected. For example, for a robotic station arranged to detect much smaller defects (e.g., sub-micron-sized particles) based on the various descriptions provided herein, the name identifier may start at a size of 0.25 μm. Further, the name identifier may be based on a characteristic dimension of the detected defect such as, for example, an average defect diameter, an equivalent aerodynamic defect diameter, a maximum dimension of the defect, a minimum dimension of the defect, or some other set of chosen characteristic dimension(s) of a defect.

TABLE I

| Bin Number | Name Identifier |
|---|---|
| 1 | ≤15 μm Defects |
| 2 | ≤20 μm Defects |
| 3 | 20 μm to 50 μm Defects |
| 4 | 50 μm to 100 μm Defects |
| 5 | 100 μm to 500 μm Defects |
| 6 | 0.5 mm to 1 mm Defects |
| 7 | ≥1 mm Defects |

Based on a selection in the bin-size selection block 559, an end-user has an ability to select which defect size range or size ranges are displayed. In one embodiment, a default setting would have all bins selected and deselecting a bin would reduce the total number of defects displayed in the defect information and the number of defects used in the three plots. Generally, an end-user may desire to see only distributions of larger sizes of detected defects. If multiple records are selected, the same selection criteria can apply to all displayed records in the defect information and the number of defects used in the three plots.

The download AVI info block 565 can be selected to download all the AVI data for the AVI records that are being analyzed. The AVI data may be downloaded to, for example, a spreadsheet in a selectable format.

Any of the series of blocks to display information related to a selected AVI file described above with reference to the AVI dashboard 530 of FIG. 5C may be selected (e.g., by tapping on the image or clicking on the image) to show an enlarged version of the information. For example, an end-user can click on the area to display the heatmap 549 to show a full-screen (or some pre-determined area of the screen) version of the heatmap 595, shown and described with reference to FIG. 5G, below.

Figure 5E:
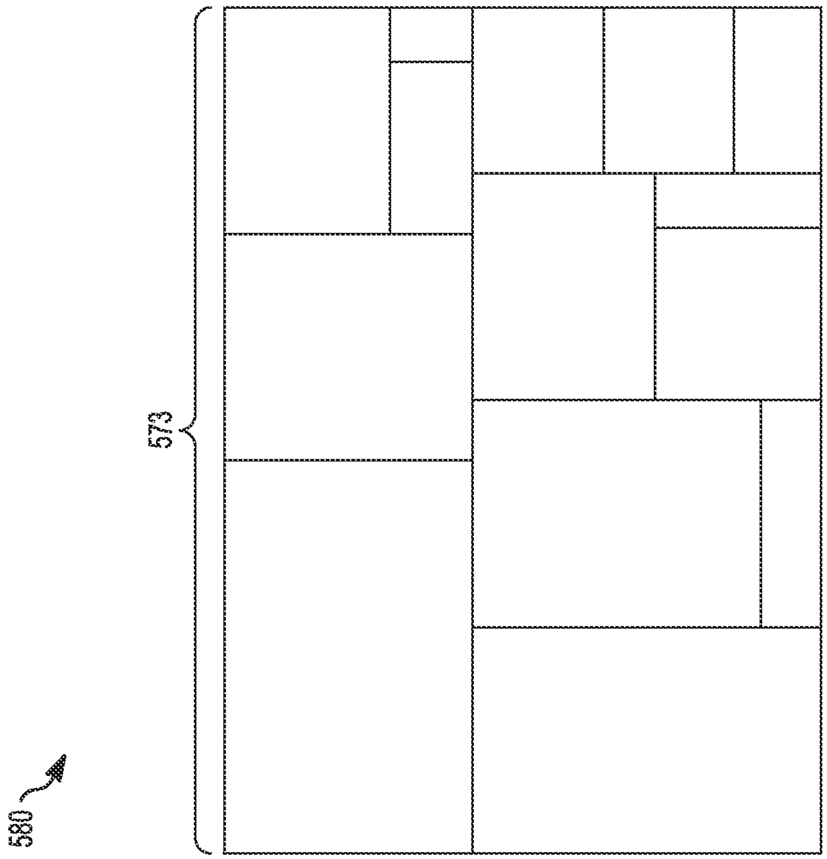
Figure 5D:
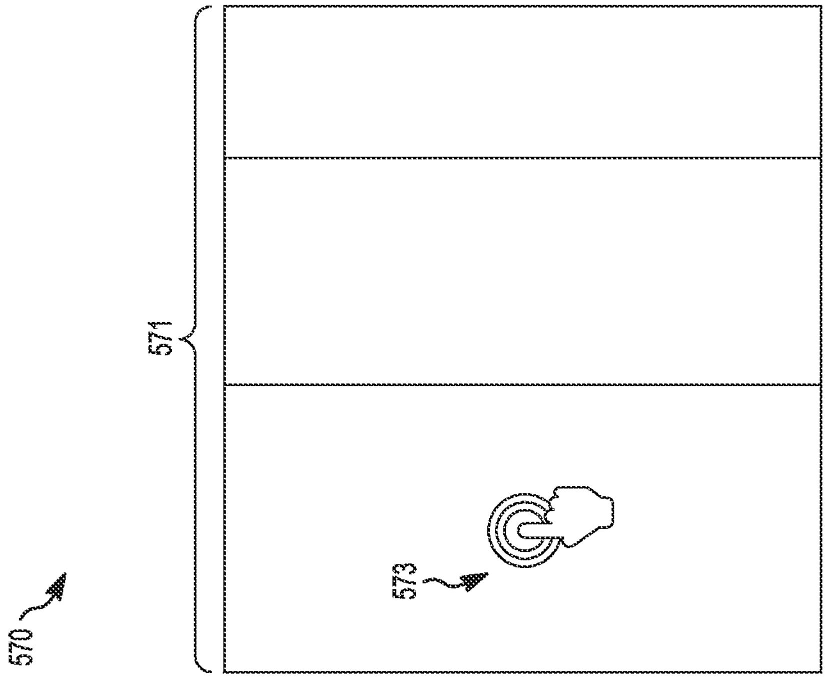

With concurrent reference now to FIGS. 5D and 5E, a high-level tree plot 570 includes a number of AVI record IDs 571. An end-user may choose a selected area 573 within a portion of the high-level tree plot 570 to display a low-level tree plot 580. The low-level tree plot 580 includes a number of images within the selected area 573. Consequently, the end-user is able to choose the selected area 573 within the high-level tree plot 570 to drill down to extract or magnify the selected area 573 from the high-level tree plot 570. In one embodiment, the selected area 573 can be pre-determined in area, with a given aspect ratio. In another embodiment, the selected area 573 can be chosen based on, for example, selecting an upper-left coordinate and a lower-right coordinate for areas of interest. In other embodiments, both options for choosing an area can be implemented by selecting with a single tap or click on a display screen or selecting the upper-left coordinate and the lower-right coordinate for areas of interest. Once the low-level tree plot 580 is selected, the low-level tree plot 580 can effectively become a new version of the high-level tree plot 570. Portions of the new version of the high-level tree plot 570 may also now be chosen within a new version of the selected area 573.

A size and color of each box in the high-level tree plot 570 and the low-level tree plot 580 of FIGS. 5D and 5E can be based on, for example, an aggregated detected-defect count at each level or on another selected parameter. Upon reading and understanding the disclosed subject matter, a person of ordinary skill in the art will recognize that the tree plots of FIGS. 5D and 5E indicate a two-dimensional (2D) plot obtained from image scans from the robotic station 300 (see FIG. 3A) based on scans in a Cartesian-coordinate system. However, the skilled artisan will recognize that scans from other coordinate systems may be displayed as well. Further, the skilled artisan will recognize that three-dimensional (3D) images may be displayed as well. The selection of coordinate system and a 2D versus 3D display applies to all plot types described herein.

Figure 5F:
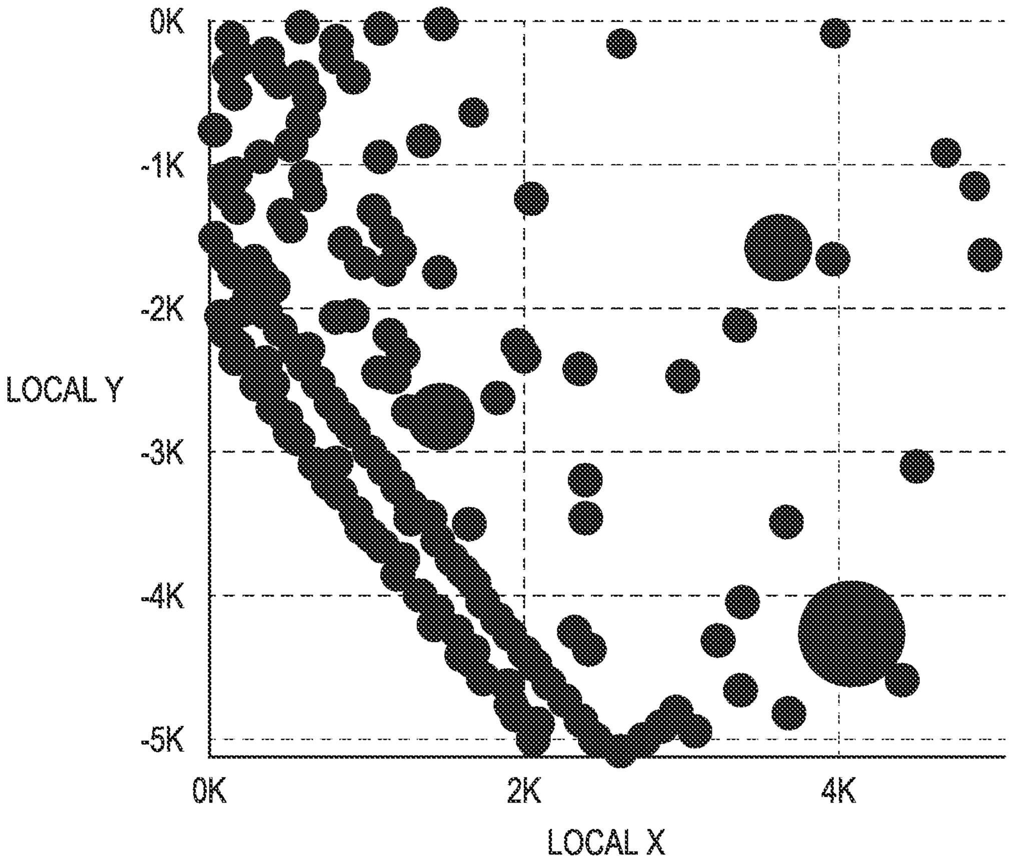

FIG. 5F shows the scatter plot 590. As described above, the scatter plot 590 can be based on, for example, details of detected defect for a given image. Parameters of each of the defect in the image can include a local y-location (e.g., displayed in units of thousands of mm), a local x-location (e.g., displayed in units of thousands of mm), both displayed as being located a given distance from a "0,0" starting point (or other coordinate system parameters). The scatter plot 590 also indicates an area of each defect. Parameters such as the global location and the areal size may be used to construct the scatter plot 590. In embodiments, a particular color may be selected to plot a given defect type and can be based on a "DefectType" attribute in a JSON file for a particular image.

Figure 5G:
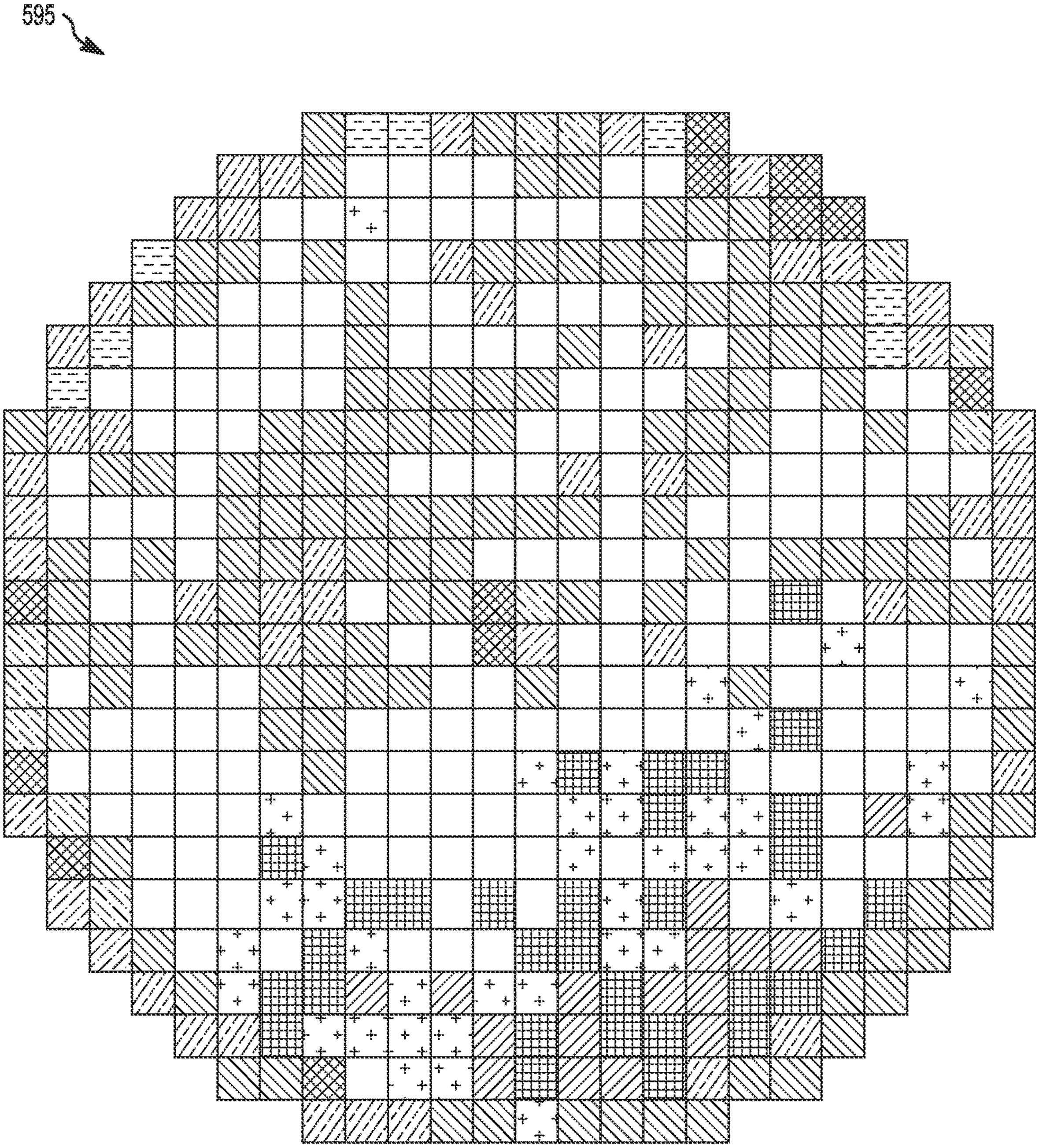

FIG. 5G shows the heatmap 595. As described above, the heatmap 595 indicates a global x-location and global y-location (or other coordinate system parameters if applicable) of a detected defect with reference to the location of each detected defect on the selected part. In various embodiments, color coding can be based to indicate a number of defects in a given region or area. For example, a yellow color can be selected to correspond to a portion of an image having minimum defects and a blue color can be selected to correspond to a portion of an image having maximum defects.

With reference again to FIG. 5A, the top-level landing page 500 is shown to include one more link, the image-viewer link 505. After selecting the image-viewer link 505, an end-user will be taken to a separate portal (not shown but understandable to a person of ordinary skill in the art) that allows the end-user to perform an AVI search, such as by a part number or AVI record number as described above with reference to FIGS. 5B and 5C, and display the image (e.g., either as a color image or a gray-scaled image) on a display screen.

Figure 6A:
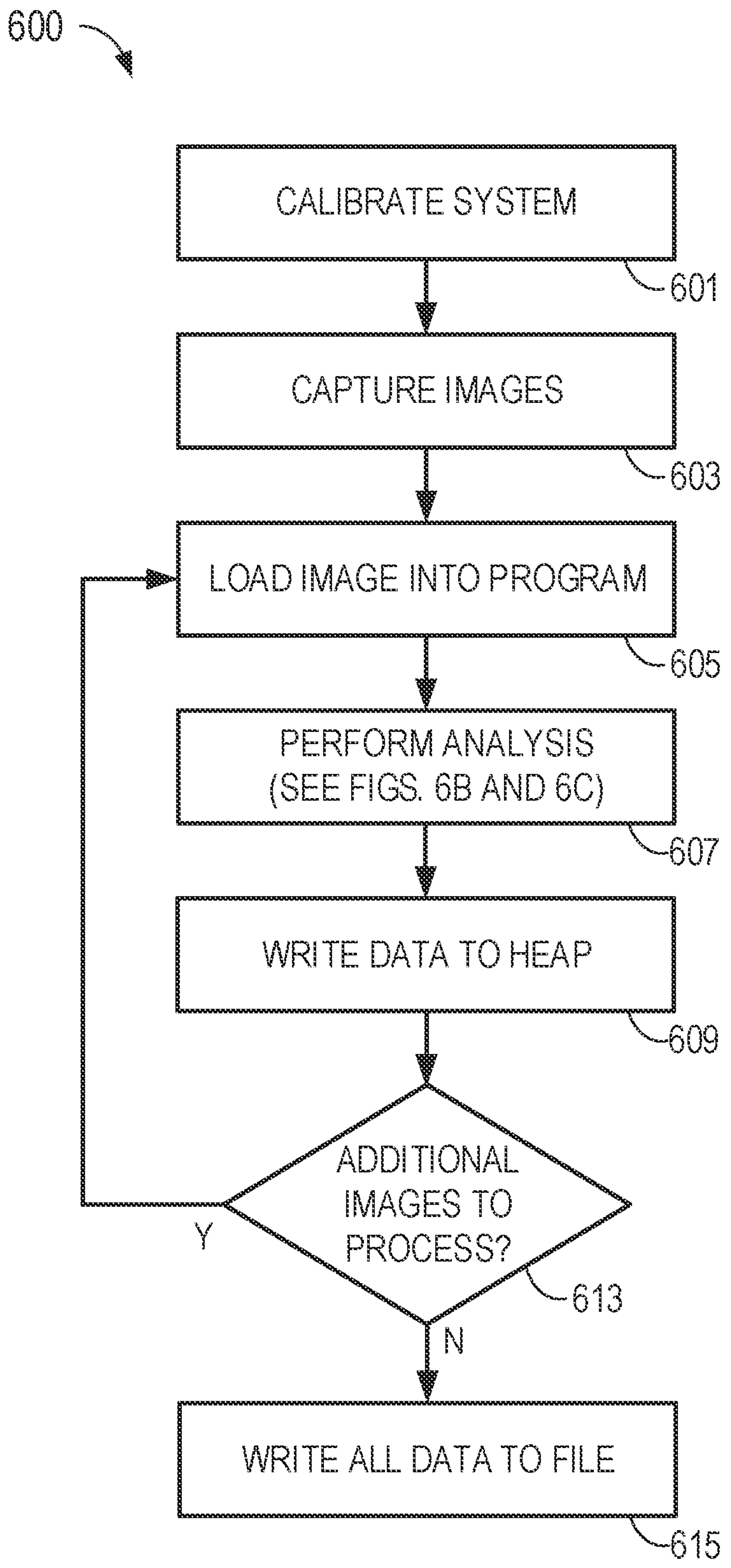
FIGS. 6A through 6C show examples of a method for performing an automated inspection of components in accordance with various embodiments of the disclosed subject matter.
Figure 6B:
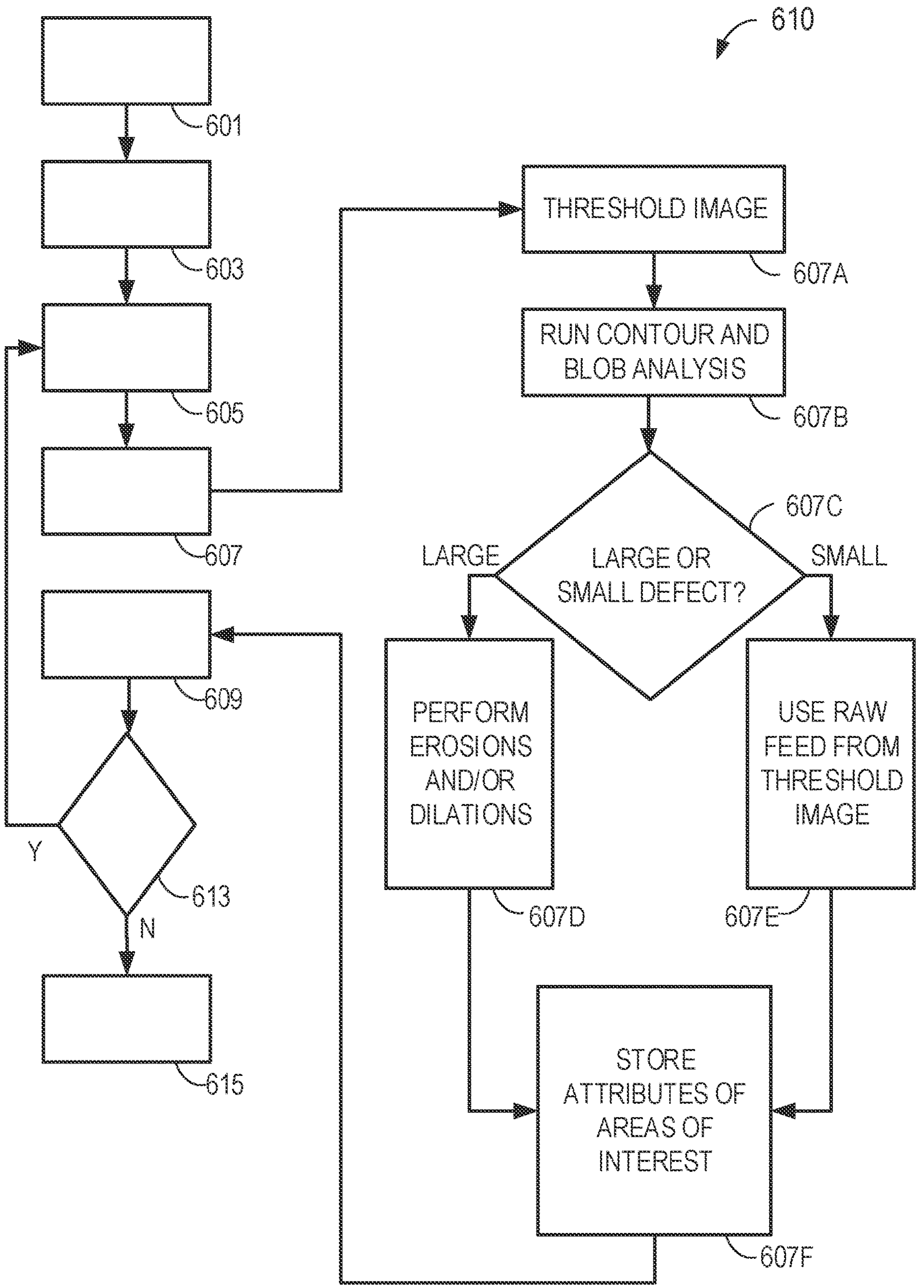
Figure 6C:
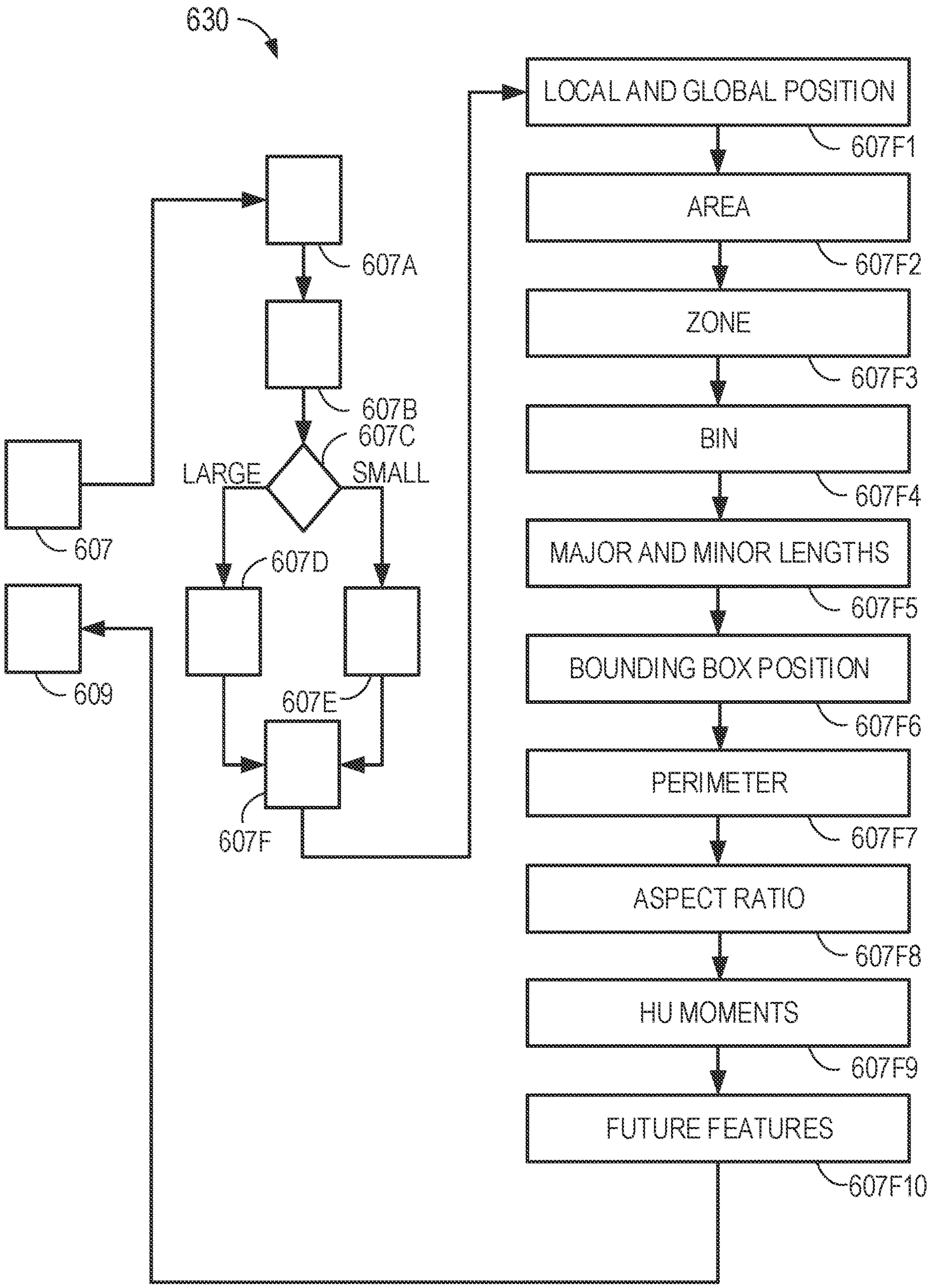

With reference now to FIGS. 6A through 6C, a method for performing an automated inspection of components in accordance with various embodiments of the disclosed subject matter is shown.

FIG. 6A shows an exemplary embodiment of an overall high-level method 600 for setting up an automated system (e.g., the robotic station 300 of FIG. 3A) and capturing, analyzing, and recording images. At operation 601, the automated system is calibrated. In embodiments, calibration can involve, for example, focusing the lens 305 of the robotic station 300 onto one common plane of the component 311. In various embodiments, the focusing may be accomplished by selecting, for example, three or four separate points on the common plane, by driving the robot 301 to spatially-separated focusing points of the common plane. An acceptable focus can be based on a pre-determined criteria for what is considered "acceptable focus." The pre-determined criteria for acceptable focus establishes a focus score and may involve, for example, a spatial-resolution accuracy or repeatability of the robot, combined with a depth-of-field of the lens, thereby establishing a tolerance value for the focus. Further, the focus score and calibration procedure can help mitigate any misalignment problems occurring when the component 311 is mounted to the mounting table 307. The calibration procedure may be re-established for different planes of the component 311 (e.g., sidewalls in a non-planar component).

At operation 603, the automated system begins capturing images using the using the robot 301, the sensor 303, and the lens 305 combination. The images are captured with the with a pre-determined field-of-view (relating to a given area) and step size (e.g., one image captured every 10 mm in both x- and y-directions (or some other selected coordinate system). The captured images can also include some pre-determined level of image overlap. For example, in some embodiments, an overlap of images may be selected to be from 5% overlap to an overlap of about 10% in both x- and y-directions. In other embodiments, an overlap of images may be selected to be from, for example, about 0% overlap (no overall of subsequent images) to an overlap of about 50%. In still other embodiments, there may be a "negative overlap." The negative overlap indicates that less than 100% inspection of a component may be used if a determination is made that not all surfaces of the component need to be fully inspected.

At operation 605, the captured image is loaded into a program for storage and further analysis. Some embodiments of the further analysis includes operations described with reference to FIGS. 6B and 6C, below. The further analysis is performed at operation 607.

Either after or while the analysis is performed at operation 607, at least portions of data generated by the analysis is written to an area of storage in a data heap at operation 609. A determination is made at operation 613 as to whether additional images remain that need to be processed. If additional images need to be processed, the overall high-level method 600 returns to operation 605 in which case one or more remaining captured images are loaded into a program for storage and further analysis.

Upon reading and understanding the disclosed subject matter, a person of ordinary skill in the art will recognize that, unlike the method 600 that infers a serial flow of images for storage and further analysis, the skilled artisan will recognize that many or all of the captured images may be stored and analyzed in parallel (e.g., in a pipelined configuration known in the art). After all captured images are processed, all data are written to a file (e.g., the JSON file described above) at operation 615.

FIG. 6B shows an exemplary embodiment of a method 610 in which the additional set of operations performed within the further analysis portion of FIG. 6A from operation 607 is further expanded. At operation 607A, each captured images undergoes a threshold image-analysis. The threshold image-analysis determines black areas of interest in the captured image. A thresholding level is determined based on detected defects within the captured image. The determination of the thresholding level is based on operations known in the relevant art, such as graphics and image processing arts. In various embodiments, a pre-determined thresholding level may be applied substantially uniformly to all images. In alternative embodiments, a thresholding level may be determined and applied separately for each captured image based on various factors (e.g., a number of detected defects and a contrast level of the image).

At operation 607B, a contour and blob analysis is performed on the captured image. The contour and blob analysis is based on certain pre-determined criteria to group pixels together that likely form a part of a larger defect. For example, a series of pixels indicative of a detected defect (e.g., based on the thresholding analysis described above) may be indicative of a scratch on the component 311 (see FIG. 3A) and are accordingly grouped together as described in more detail, below.

At operation 607C, a determination is made on whether the detected defect is to be classified as a large defect or a small defect. A determination of "large" versus "small" is made based factors such as, for example, an impact that a detected defect may have on a completed component. For example, if a completed part may need to be reworked due to a large particle, pit, or scratch, which can potentially affect performance of the component once placed into a tool (e.g., a plasma-based processing chamber), the defect may be considered "large." The determination may be made based on adding the component to mating parts or the possibility of the defect (e.g., a particle) shedding from the component onto a substrate within the chamber undergoing processing. If the defect is unlikely to have an effect on performance of the tool, the defect may be considered to be "small." Each component type may have a separate set of criteria to make a determination as to whether the defect is classified as "large" or "small." Upon reading and understanding the disclosed subject matter, a person of ordinary skill in the art will recognize how to make such a classification determination based on a particular application of the disclosed subject matter.

If a determination is made at operation 607C that the defect is "large," then erosion and/or dilation steps are performed at operation 607D. The erosion and dilation steps are performed potentially to link pixels identified as a portion of the large defect together. For example, an erosion step increases an area of black regions from the threshold image (from operation 607A) to link the black regions together to group the black regions as a larger defect. Conversely, the dilation step reduces an area of black regions from the threshold image that are determined not to belong to a larger defect. Consequently, in this embodiment, dilation increases the size of white areas and erosion increases size of black areas. As described in various embodiments, the black areas comprise the areas of interest.

If a determination is made at operation 607C that the defect is "small," then a raw feed of the threshold image (from operation 607A) is passed through directly at operation 607E. That is, no erosion or dilation steps are performed on the "small" defect.

At operation 607F, attributes of all areas of interest (e.g., all detected defects) are stored for later retrieval by, for example, by the AVI dashboard 530 of FIG. 5C. Flow control of the method 610 then returns to operation 609 within the method 600 of FIG. 6A.

FIG. 6C shows an exemplary embodiment of a method 630 in which the attributes of all areas of interest stored for later retrieval from operation 607F of FIG. 6B are further expanded. At operation 607F1, both a local position and a global position of each area of interest (e.g., a detected defect) are determined. The local and global positions of each defect may be based on, for example, a location of a geometrical centroid of the defect with reference to another defect or a location of the geometrical centroid of the defect with reference to a global position on the component (a determined "0,0" or "0,0,0" coordinate position).

At operation 607F2, a determination of a geometrical area for each of the areas of interest (e.g., the detected defect) is determined. At operation 607F3, a determination is made for a zone in which the defect is located is made. The determined zone can later be used when performing analysis using the static image with zones 553 indicator of the AVI dashboard 530 of FIG. 5C. A further determination is made at operation 607F4 into which bin size each defect should be placed. The determination of bin size can later be used when performing analysis using the bin-size selection block 559 of the AVI dashboard 530 (see also Table I and the accompanying description provided herein).

At operation 607F5, a determination is made as to a major length and a minor length of each detected defect. The major and minor lengths may be determined using bounding boxes. As is known in the relevant art, a bounding box is a virtual box with coordinates of, for example, a square or a rectangular border, that encloses a digital image. Since the bounding box is based on spatial coordinates, the bounding box can also be rotated to enclose a digital image. A square bounding box may be placed around a circular defect whereas a rectangular bounding box may be placed around an elongated defect (e.g., a defect having an aspect ratio greater than 1:1) or a scratch (e.g., a defect having an aspect ratio much greater than 1:1). The elongated defect and the scratch may be determined based on some pre-determined criteria (e.g., an aspect ratio greater than 10:1 may be classified as a scratch). A determination of a spatial extent of the digital image, in this case, the detected defect, may be based on an edge-based determination (e.g., a contrast comparison) of the digital image with a proximate background (e.g., a non-defect area of the captured image from the component).

Machine Learning (ML) may be used to differentiate defects into various classes based upon prior training data that were used to train the model. In various exemplary embodiments, the AVI tool disclosed herein utilizes machine learning for defect differentiation. In a specific exemplary embodiment, one or more neural networks extract information from captured images. Extracting information from the captured images is a technique referred to as "deep learning." One such tool is the Alita® AVI Tool, registered to Lam Research Corporation, 4650 Cushing Parkway Fremont, California USA, 94538.

The first step in extracting information is to run the disclosed AVI program as is, using the feature identification procedures outlined herein. One of the attributes that is obtained for each feature is the bounding box location. In embodiments, the bounding box provides the extreme right, extreme left, extreme top, and extreme bottom edges of the feature image in pixels. From a large extracted-image, several small images are produced for each feature in the image (in a specific embodiment, greater than about 100 μm in a major characteristic-length) and saved, for example, locally to a hard drive or other storage unit or memory known in the art. At the conclusion of an image capture process, the main program initiates a machine-learning (ML) program. The ML program reads all the feature "snips" and other attributes of the snip (e.g., aspect ratio and a radial distance of the defect from the identified or chosen center of a part (defglobalR) and passes this information into an ML-prediction model. From here, the model predicts the type of the feature as well as the associated probability of being a particular type, or one of various other type or types. Information about the feature types are stored into, for example, a comma-separated-values (csv) file, which may then be read back into the main program. The main program parses the defect types and probabilities into a main data-interchange format (e.g., the json file defined herein) and then writes this data-interchange format file to the hard drive (or other storage or memory unit), thus completing a full scan.

In embodiments, image snipping occurs in line with the main program because the images are already stored in memory while the ML program runs at the end of the program. In this embodiment, the ML program can run more efficiently passing all of the information in at one time instead of one image at a time.

In an example, the machine-learning model may take roughly four to six extra minutes to run compared to a normal scan. However, the extra time is heavily dependent on the number of features requiring prediction. The extra time in this example is roughly 39 milliseconds added per snip (including cropping and prediction).

These types are trained into the model via a training set of data that contains folders of images for each type of defect expected. These images are extracted from real world data and manually sorted to obtain original-training data. Each of the types are separated into several number codes (e.g., 0600) that are arranged to closely resemble a real world defect (such as a stain). In various embodiments, there may be, for example, 10 classes, but this number can vary greatly. For example, the numeric code may have two parts—"primary parts" and "secondary parts," comprising the first two and the following two numbers of the code respectively. Therefore, in one example, 0600 could be a "stain" while 0601 could be an "etched stain."

Several different models for image predictions, known to those in the art, can be used, with models based on an open-source machine learning library (one such example of an ML library is available from PyTorch at pytorch.org or Python-based implementation models such as the VGG model or InceptionNet model). After training, the model is stored into a model file which can then be run through a program (e.g., maintained either in the cloud or on Internet-of-Things (IoT) Edge modules, known to those of skill in the art). Consistency may be maintained throughout the entire Data Fabric by tying each prediction to its model version number (e.g., CV_1.0.0.1), which is unique to the training data that was used as well as any additional tuning parameters, which are also known to the person of ordinary skill in the art.

With various labeled classes that contain defect snips, images model gets trained and saved that learning into a pickle file and inferences can be drawn based on this learning (a pickle is a Python module that is used to serialize and deserialize Python objects into a binary format so you can store them on disk or send them over the network in an efficient and compact manner). The same pickle file may then be used whenever a new part (e.g., a new crystal window) is subject to inspection.

At operation 607F7, a determination is made of a perimeter (e.g., a circumference of a circularly-shaped detected defect). The determination of the perimeter may be based on a determination of, for example, an edge-based determination (e.g., a contrast comparison) of the digital image with a proximate background. At operation 607F8, a determination of an aspect ratio of the detected defect is made based on, for example, determinations of the aspect ratios of a major length versus a minor length of the bounding boxes as described above.

At operation 607F9, a determination of Hu moments (Hu invariants) is made for each of the detected defects. The Hu moments are known in the fields of image processing and computer vision and describe an image moment having a particular weighted-average (moment) of intensities of an image pixel or a function of such moments. The Hu moments comprise a set of seven numbers calculated using central moments that are invariant to image transformations.

Operation 607F10 provides additional routines for future additions for the attributes of all areas of interest including, for example, a height or depth of a defect (e.g., based on phase contrast analysis, such as differential-phase contrast (DPC) techniques) or a type (e.g., based on machine learning), morphology, or even composition (e.g., based on EDX or XRF analysis, described above), for each of the detected defects. Flow control of the method 630 then returns to operation 609 within the method 600 of FIG. 6A.

Upon reading and understanding the disclosed subject matter, a person of ordinary skill in the art will recognize that, unlike the method 630 chart that infers a serial flow of a determination of attributes of all areas of interest (e.g., all detected defects), the skilled artisan will recognize that many or all of the may be performed in parallel (e.g., in a pipelined configuration known in the art).

Figure 7:
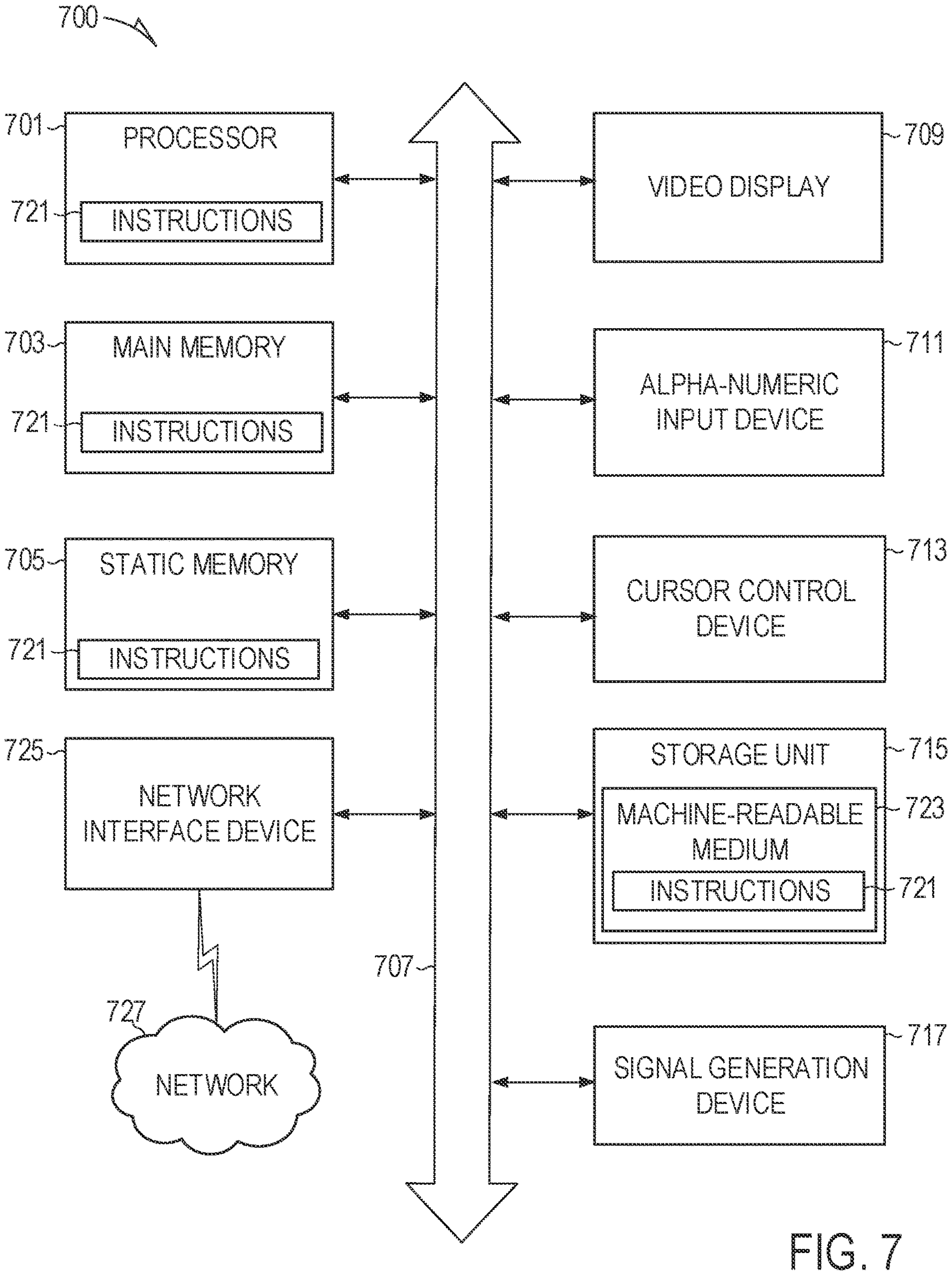
FIG. 7 shows a block diagram illustrating an example of a machine upon which one or more exemplary embodiments of the disclosed subject matter may be implemented, or by which one or more exemplary embodiments may be implemented or controlled.

FIG. 7 shows a block diagram illustrating an example of a machine upon which one or more exemplary embodiments of the disclosed subject matter may be implemented, or by which one or more exemplary embodiments may be implemented or controlled. In alternative embodiments, the machine 700 may operate as a standalone device or may be connected (e.g., networked) to other machines. In a networked deployment, the machine 700 may operate in the capacity of a server machine, a client machine, or both, in server-client network environments. In an example, the machine 700 may act as a peer machine in a peer-to-peer (P2P) (or other distributed) network environment. Further, while only a single instantiation of the single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed-particles, etc.) to encode instructions of the specific operation.

In coupling or connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine 700 (e.g., computer system) may include a hardware processor 701 (e.g., a central processing unit (CPU), a hardware processor core, or any combination thereof), a graphics processing unit (GPU) 702, a main memory 703, and a static memory 705, some or all of which may communicate with each other via an interlink 707 (e.g., a bus). The machine 700 may further include a display device 709, an alphanumeric input-device 711 (e.g., a keyboard), and a user-interface (UI) navigation-device 713 (e.g., a mouse or other type of cursor control device). In various embodiments, the display device 709, the alphanumeric input-device 711, and the UI navigation-device 713 may comprise a touch-screen display. The machine 700 may additionally include a storage unit 715 (e.g., a mass storage drive unit or solid-state memory device), a signal-generation device 717 (e.g., a speaker), a network interface-device 725, and one or more sensors 724, such as a Global Positioning System (GPS) sensor, a compass, an accelerometer, an indexing sensor, a position sensor, or another type of sensor. The machine 700 may include an output controller 718, such as a serial (e.g., universal serial bus (USB)), parallel, or other wired or wireless (e.g., infrared (IR), near field communication (NFC), etc.) connection to communicate with or control one or more peripheral devices (e.g., a printer, a card reader, etc.).

The storage unit 715 may include a machine-readable medium 723 on which is stored one or more sets of data structures or one or more instructions 721 (e.g., software or firmware) embodying or utilized by any one or more of the techniques, functions, or methods described herein. The instructions 721 may also reside, completely or at least partially, within the main memory 703, within the static memory 705, within the hardware processor 701, or within the GPU 702 during execution thereof by the machine 700. In an example, one or any combination of the hardware processor 701, the GPU 702, the main memory 703, the static memory 705, or the storage unit 715 may constitute machine-readable media.

While the machine-readable medium 723 is illustrated as a single medium, the term "machine-readable medium" may include a single medium, or multiple media (e.g., a centralized or distributed database, and/or associated caches and servers) configured to store the one or more instructions 721.

The term "machine-readable medium" may include any medium that can store, encode, or carry the instructions 721 for execution by the machine 700, and that cause the machine 700 to perform any one or more of the techniques of the present disclosure, or that can store, encode, or carry data structures used by or associated with such of the one or more instructions 721. Non-limiting machine-readable medium examples may include solid-state memories, and optical and magnetic media. In an example, a massed machine-readable medium comprises a machine-readable medium 723 with a plurality of particles having invariant (e.g., rest) mass. Accordingly, massed machine-readable media are not transitory propagating-signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. Consequently, each of the afore-mentioned and other types of non-transitory media are physically capable of movement or capable of being moved themselves. Further, the computer-readable medium may be considered to be a tangible computer-readable medium having no transitory signals. The instructions 721 may further be transmitted or received over a communications network 727 using a transmission medium via the network interface-device 725.

As used herein, the term "or" may be construed in an inclusive or exclusive sense. Further, other embodiments will be understood by a person of ordinary skill in the art based upon reading and understanding the disclosure provided. Moreover, the person of ordinary skill in the art will readily understand that various combinations of the techniques and examples provided herein may all be applied in various combinations.

Throughout this specification, plural instances may implement components, operations, or structures described as a single instance. Although individual operations of one or more methods are illustrated and described as separate operations, one or more of the individual operations may be performed concurrently, and, unless otherwise stated, nothing requires that the operations necessarily be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Although various embodiments are discussed separately, these separate embodiments are not intended to be considered as independent techniques or designs. As indicated above, each of the various portions may be inter-related and each may be used separately or in combination with other embodiments of the disclosed subject matter discussed herein. For example, although various embodiments of methods, operations, systems, and processes have been described, these methods, operations, systems, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to ascertain quickly the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

The Following Numbered Examples are Specific Embodiments of the Disclosed Subject Matter Example 1: An embodiment of the disclosed subject matter describes an inspection system that includes a plurality of robots with one or more cameras coupled to each of respective ones of the plurality of robots to inspect a component for defects at various stages of fabrication. Each of the cameras is located at a different geographical location corresponding to the various stages in the fabrication of the component. At least some of the cameras are configured to inspect all surfaces of the component that are not facing a table upon which the component is mounted. A data-collection station is electronically coupled to each of respective ones of the plurality of robots and an associated one of the cameras. A master data-collection station is electronically coupled to each of the data-collection stations. In embodiments, the master data-collection station may be remotely based.

Example 2: The inspection system of Example 1, wherein the respective ones of the plurality of robots and the associated one of the cameras is located with a different supplier that is used in the various stages in the fabrication of the component.

Example 3: The inspection system of any one of the preceding Examples, wherein the cameras comprise an active-pixel sensor-based camera and lens combination.

Example 4: The inspection system of Example 3, wherein the active-pixel sensor-based camera is selected from at least one sensor type including a CMOS-based sensor, a CCD-based image sensor, and another type of digital-imaging sensor.

Example 5: The inspection system of any one of the preceding Examples, further including a telecentric lens and an illumination source, the telecentric lens configured to mount on the camera, the illumination source configured to provide in-line illumination into an optical train of the telecentric lens.

Example 6: The inspection system of Example 5, wherein further including a beam splitter arranged at an output of the illumination source to redirect the output of the illumination source into the optical train of the telecentric lens.

Example 7: The inspection system of any one of the preceding Examples, wherein each of the plurality of robots has multiple joints and multiple degrees-of-freedom.

Example 8: The inspection system of any one of the preceding Examples, wherein a serial number is associated with the component and remains constant throughout the various stages in the fabrication of the component and a part number of the component varies depending upon what stage the component is at in the fabrication.

Example 9: The inspection system of any one of the preceding Examples, wherein each of the plurality of robots comprises a collaborative robot (cobot) designed to work safely in close proximity to areas shared between the cobot and humans by limiting at least one factor including factors selected from a speed of movement of the cobot and a force of the cobot.

Example 10: The inspection system of any one of the preceding Examples, wherein the robot is programmed to scan at a pre-determined distance from vertical, horizontal, and other orientations of surfaces on the components.

Example 11: The inspection system of any one of the preceding Examples, further including at least one additional inspection of the component selected from inspection techniques comprising microscopy, optical profilometry, and stylus-based profilometry.

Example 12: The inspection system of any one of the preceding Examples, further including at least one analytical technique, including analytical techniques selected from energy-dispersive X-ray spectroscopy (EDX) and X-ray fluorescence (XRF).

Example 13: The inspection system of any one of the preceding Examples, wherein further including a process-monitoring database electronically coupled to the master data-collection station, the process-monitoring database containing metrics based on image quality for how an idealized sample of the component should appear at each step in the various stages of the fabrication of the component.

Example 14: The inspection system Example 13, wherein the master data-collection station is configured to compare the idealized sample of the component to an actual version of the component at each step in the various stages of the fabrication of the component.

Example 15: The inspection system of Example 14, wherein a resulting component variation from a comparison of the idealized sample with the actual version of the component at each step in the various stages of the fabrication of the component is analyzed by the master data-collection station to provide manufacturing trends in substantially real-time in the fabrication of the component.

Example 16: The inspection system of any one of the preceding Examples, further including a customer-defect data database electronically coupled to the master data-collection station to correlate defects produced on a processed substrate to interactions from multiple ones of completed components installed in a processing tool used to process the substrate.

Example 17: The inspection system of Example 16, wherein the master data-collection station is configured to provide comparisons between various components fabricated at different time periods.

Example 18: An embodiment of the disclosed subject matter describes a method for operating an automated visual-inspection (AVI) system for detecting defects on a component. The method includes calibrating the AVI system; capturing a plurality of images from the component; and loading each of the plurality of captured images into a program to analyze the captured images for a presence of defects within the captured images.

Example 19: The method of Example 18, further including setting a threshold image for determining black areas of interest in the plurality of captured images; and determining a thresholding level for setting the threshold image being based on detected defects within each of the plurality of captured images.

Example 20: The method of Example 19, further including making a determination whether a detected defect from the plurality of captured images is one of a large defect and a small defect. Based on a determination that the detected defect is a large defect, performing at least one operation selected from operations including an erosion operation and a dilation operation to make a determination as to whether black regions from the detected defect are included as at least a portion of a larger defect.

Example 21: An embodiment of the disclosed subject matter describes an automated visual-inspection (AVI) system to detect defects on a component. The AVI system includes a number of robots, with each of the plurality of robots having one or more mounted camera and lens combinations to inspect the component undergoing fabrication steps at various stages of fabrication. The camera includes a digital-imaging sensor. Each of the number of robots is located at a different geographical location corresponding to the various stages in the fabrication of the component. The AVI system also includes a data-collection station that is electronically coupled to each of respective ones of the numbers of robots, and a master data-collection station that is electronically coupled to each of the data-collection stations. The master data-collection station is arranged to compare an idealized sample of the component to an actual version of the component at each step in the various stages of the fabrication of the component. In embodiments, the master data-collection station may be remotely based.

Example 22: The AVI system of Example 21, wherein at least some of the camera and lens combinations are configured to inspect all surfaces of the component that are not facing a table upon which the component is mounted.

Example 23: The AVI system of either Example 21 or Example 22, wherein each of the camera and lens combinations is located at a different geographical location corresponding to the various stages in the fabrication of the component.

Example 24: The AVI system of any one of the preceding Examples 21 et seq., wherein at least some of the camera and lens combinations are arranged to inspect all surfaces of the component that are not facing a table upon which the component is mounted.

Example 25: The AVI system of any one of the preceding Examples 21 et seq., further including a telecentric lens and an illumination source, the telecentric lens configured to mount on the camera, the illumination source configured to provide in-line illumination into an optical train of the telecentric lens.

Example 26: The AVI system of any one of the preceding Examples 21 et seq., wherein each of the plurality of robots comprises a collaborative robot (cobot) designed to work safely in close proximity to areas shared between the cobot and humans by limiting at least one factor including factors selected from a speed of movement of the cobot and a force of the cobot.

Example 27: The AVI system of any one of the preceding Examples 21 et seq., wherein the robot is programmed to scan at a pre-determined distance from vertical, horizontal, and other orientations of surfaces on the components.

Example 28: The AVI system of any one of the preceding Examples 21 et seq., wherein a resulting component variation from a comparison of the idealized sample with the actual version of the component at each step in the various stages of the fabrication of the component is analyzed by the master data-collection station to provide manufacturing trends in substantially real-time in the fabrication of the component.

What is claimed is:

1. An inspection system, comprising:

a plurality of robots;

one or more cameras coupled to each of respective ones of the plurality of robots to generate a plurality of captured images of a component and inspect the component for defects at various stages of fabrication, each of the cameras being located at a different geographical location corresponding to the various stages in the fabrication of the component, at least some of the cameras being configured to inspect all surfaces of the component that are not facing a table upon which the component is mounted;

a data-collection station electronically coupled to each of respective ones of the plurality of robots and an associated one of the cameras; and a master data-collection station electronically coupled to each of the data-collection stations, the inspection system being further configured to:

set a threshold image for determining black areas of interest in at least one detected defect from the one or more cameras coupled to each of respective ones of the plurality of robots;

determine a thresholding level for setting the threshold image based on the at least one detected defect within at least one of the plurality of captured images;

perform a contour and blob analysis on the at least one of the plurality of captured images based on pre-determined criteria to group pixels together that likely form a part of a larger defect:

make a determination whether the at least one detected defect is one of a large defect or a small defect based on a characteristic size of the defect or a location of the defect within the component, wherein the small defect is a defect that is unlikely to have an effect on performance of a tool in which the component is to be installed;

based on a determination that the at least one detected defect is a large defect, perform at least one operation selected from operations including an erosion operation and a dilation operation to make a determination as to whether black regions from the at least one detected defect are included as at least a portion of a larger defect; and based on a determination that the at least one detected defect is the small defect, pass a raw feed of the threshold image through directly without performing the erosion operation or the dilation operation.

2. The inspection system of claim 1, wherein the respective ones of the plurality of robots and the associated one of the cameras are located with a different supplier that is used in the various stages in the fabrication of the component.

3. The inspection system of claim 1, wherein the cameras comprise an active-pixel sensor-based camera and lens combination.

4. The inspection system of claim 3, wherein the active-pixel sensor-based camera is selected from at least one sensor type including a CMOS-based sensor, a CCD-based image sensor, and another type of digital-imaging sensor.

5. The inspection system of claim 1, further comprising a telecentric lens and an illumination source, the telecentric lens configured to mount on the camera, the illumination source configured to provide in-line illumination into an optical train of the telecentric lens.

6. The inspection system of claim 5, further comprising a beam splitter arranged at an output of the illumination source to redirect the output of the illumination source into the optical train of the telecentric lens.

7. The inspection system of claim 1, wherein each of the plurality of robots has multiple joints and multiple degrees-of-freedom.

8. The inspection system of claim 1, wherein a serial number is associated with the component and remains constant throughout the various stages in the fabrication of the component, and a part number of the component varies depending upon what stage the component is at in the fabrication.

9. The inspection system of claim 1, wherein each of the plurality of robots comprises a collaborative robot (cobot) designed to work safely in close proximity to areas shared between the cobot and humans by limiting at least one factor, including factors selected from a speed of movement of the cobot and a force of the cobot.

10. The inspection system of claim 1, wherein the robot is programmed to scan at a pre-determined distance from vertical, horizontal, and other orientations of surfaces on the component.

11. The inspection system of claim 1, wherein the inspection system is further configured to perform at least one additional inspection of the component selected from inspection techniques comprising microscopy, optical profilometry, and stylus-based profilometry.

12. The inspection system of claim 1, wherein the inspection system is further configured to perform at least one analytical technique, including analytical techniques selected from energy-dispersive X-ray spectroscopy (EDX) and X-ray fluorescence (XRF).

13. The inspection system of claim 1, further comprising a process-monitoring database that is electronically coupled to the master data-collection station, wherein the process-monitoring database contains metrics based on image quality for how an idealized sample of the component should appear at each step in the various stages of the fabrication of the component.

14. The inspection system of claim 13, wherein the master data-collection station is configured to compare the idealized sample of the component to an actual version of the component at each step in the various stages of the fabrication of the component.

15. The inspection system of claim 14, wherein a resulting component variation from a comparison of the idealized sample with the actual version of the component at each step in the various stages of the fabrication of the component is analyzed by the master data-collection station to provide manufacturing trends in substantially real-time in the fabrication of the component.

16. The inspection system of claim 1, further comprising a customer-defect data database electronically coupled to the master data-collection station to correlate defects produced on a processed substrate to interactions from multiple ones of completed components installed in a processing tool used to process the substrate.

17. The inspection system of claim 1, wherein the master data-collection station is configured to provide comparisons between various components fabricated at different time periods.

18. A method of operating an automated visual-inspection (AVI) system for detecting defects on a component, the method comprising:

calibrating the AVI system;

capturing a plurality of images from one or more cameras coupled to each of respective ones of a plurality of robots to inspect a component for defects at various stages of fabrication, each of the cameras being located at a different geographical location corresponding to the various stages in the fabrication of the component from the component;

loading each of the plurality of images into a program to analyze for a presence of defects within the plurality of images;

setting a threshold image for determining black areas of interest in the plurality of images;

determining a thresholding level for setting the threshold image based on at least one detected defect within at least one of the plurality of images;

performing a contour and blob analysis on the at least one of the plurality of images based on pre-determined criteria to group pixels together that likely form a part of a larger defect;

making a determination whether the at least one detected defect from the plurality of images is one of a large defect or a small defect based on a characteristic size of the defect or a location of the defect within the component, wherein the small defect is a defect that is unlikely to have an effect on performance of a tool in which the component is to be installed;

based on a determination that the detected defect is a large defect, perform at least one operation selected from operations including an erosion operation and a dilation operation to make a determination as to whether black regions from the at least one detected defect are included as at least a portion of a larger defect; and based on a determination that the at least one detected defect is the small defect, passing a raw feed of the threshold image through directly without performing the erosion operation or the dilation operation.

19. An automated visual-inspection (AVI) system to detect defects on a component, the AVI system comprising:

a plurality of robots, each of the plurality of robots having one or more camera and lens combinations mounted thereto to inspect the component undergoing fabrication steps at various stages of fabrication, the camera including a digital-imaging sensor to generate a plurality of captured images of the component, each of the plurality of robots being located at a different geographical location corresponding to the various stages in the fabrication of the component;

a data-collection station electronically coupled to each of respective ones of the plurality of robots; and a master data-collection station electronically coupled to each of the data-collection stations, the master data-collection station being configured to compare an idealized sample of the component to an actual version of the component at each step in the various stages of the fabrication of the component, the AVI system being further configured to:

set a threshold image for determining black areas of interest in at least one detected defect from the one or more cameras coupled to each of respective ones of the plurality of robots;

determine a thresholding level for setting the threshold image based on the at least one detected defect within at least one of the plurality of captured images;

perform a contour and blob analysis on the at least one of the plurality of captured images based on pre-determined criteria to group pixels together that likely form a part of a larger defect;

make a determination whether the at least one detected defect is one of a large defect or a small defect based on a characteristic size of the defect or a location of the defect within the component, wherein the small defect is a defect that is unlikely to have an effect on performance of a tool in which the component is to be installed;

based on a determination that the at least one detected defect is a large defect, perform at least one operation selected from operations including an erosion operation and a dilation operation to make a determination as to whether black regions from the at least one detected defect are included as at least a portion of a larger defect; and based on a determination that the at least one detected defect is the small defect, pass a raw feed of the threshold image through directly without performing the erosion operation or the dilation operation.

20. The AVI system of claim 19, wherein at least some of the camera and lens combinations are configured to inspect all surfaces of the component that are not facing a table upon which the component is mounted.

21. The AVI system of claim 19, wherein each of the camera and lens combinations is located at a different geographical location corresponding to the various stages in the fabrication of the component.

22. The AVI system of claim 19, wherein at least some of the camera and lens combinations are configured to inspect all surfaces of the component that are not facing a table upon which the component is mounted.

23. The AVI system of claim 19, further comprising a telecentric lens and an illumination source, the telecentric lens configured to mount on the camera, the illumination source configured to provide in-line illumination into an optical train of the telecentric lens.

24. The AVI system of claim 19, wherein each of the plurality of robots comprises a collaborative robot (cobot) designed to work safely in close proximity to areas shared between the cobot and humans by limiting at least one factor, including factors selected from a speed of movement of the cobot and a force of the cobot.

25. The AVI system of claim 19, wherein the robot is programmed to scan at a pre-determined distance from vertical, horizontal, and other orientations of surfaces on the components.

26. The AVI system of claim 19, wherein a resulting component variation from a comparison of the idealized sample with the actual version of the component at each step in the various stages of the fabrication of the component is analyzed by the master data-collection station to provide manufacturing trends in substantially real-time in the fabrication of the component.

* * * * *